US008955676B2

(12) United States Patent
Young

(10) Patent No.: US 8,955,676 B2
(45) Date of Patent: *Feb. 17, 2015

(54) INSTANT SELF-HEATING CONTAINERS

(71) Applicant: Forever Young International, Inc., Henderson, NV (US)

(72) Inventor: Daniel L. Young, Henderson, NV (US)

(73) Assignee: Forever Young International, Inc., Henderson, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/031,359

(22) Filed: Sep. 19, 2013

(65) Prior Publication Data

US 2014/0014088 A1 Jan. 16, 2014

Related U.S. Application Data

(63) Continuation of application No. 13/387,213, filed as application No. PCT/US2010/043217 on Jul. 26, 2010, now Pat. No. 8,561,792.

(60) Provisional application No. 61/228,586, filed on Jul. 26, 2009, provisional application No. 61/228,592, filed on Jul. 26, 2009.

(51) Int. Cl.
*A47J 36/28* (2006.01)
*B65D 81/34* (2006.01)
*A45D 26/00* (2006.01)

(52) U.S. Cl.
CPC .............. *A47J 36/28* (2013.01); *B65D 81/3484* (2013.01); *A45D 26/0014* (2013.01)
USPC .......................................................... 206/222

(58) Field of Classification Search
USPC .................... 206/222; 126/263.09, 263.06
See application file for complete search history.

(56) References Cited

U.S. PATENT DOCUMENTS 2,300,793 A 11/1942 Martin
2,850,006 A 9/1958 Karpalo
(Continued)

FOREIGN PATENT DOCUMENTS

GB 1180059 2/1970
JP S64017988 U 1/1989
(Continued)

OTHER PUBLICATIONS

International Bureau, International Search Report for International Application No. PCT/US2010/043217, Jan. 26, 2012, pp. 1-3, Geneva, Switzerland.
(Continued)

*Primary Examiner* — Steven A. Reynolds
*Assistant Examiner* — King M Chu
(74) *Attorney, Agent, or Firm* — Gordon Rees Scully Mansukhani, LLP

(57) ABSTRACT

Instant self-heating containers include a combinable reactant and activator used to generate an exothermic reaction for heating contents of the container. One instant self-heating container includes a target container, a pierceable activator container and a reaction chamber. Piercing the activator container causes activator to combine with the reactant and cause an exothermic reaction that heats the target container. The container may be used as depilatory wax dispenser. Another instant self-heating container includes an outer housing containing a contents pouch and a reactant, and capped by a lid having an activator chamber. Rupturing the activator chamber allows activator to combine with the reactant in an exothermic reaction to heat the contents pouch. Another instant self-heating container includes a flexible outer tube containing contents to be heated, a flexible reaction vessel, and a frangible activator vessel. Bending the outer tube causes the activator vessel to rupture and cause an exothermic reaction.

16 Claims, 21 Drawing Sheets

(56) References Cited

U.S. PATENT DOCUMENTS

| | | | |
|---|---|---|---|
| 2,948,453 A | | 8/1960 | Drown |
| 3,287,140 A | * | 11/1966 | Brussell .................. 426/109 |
| 3,683,889 A | | 8/1972 | Hoffman |
| 3,903,011 A | | 9/1975 | Donnelly |
| 4,559,921 A | | 12/1985 | Benmussa |
| 4,585,843 A | | 4/1986 | Flesher et al. |
| 4,771,761 A | * | 9/1988 | Doukhan et al. ......... 126/263.09 |
| 4,926,843 A | * | 5/1990 | Vocke et al. ............... 126/390.1 |
| 5,220,909 A | * | 6/1993 | Pickard et al. ........... 126/263.08 |
| 5,255,812 A | | 10/1993 | Hsu |
| 5,984,953 A | | 11/1999 | Sabin et al. |
| 6,289,889 B1 | * | 9/2001 | Bell et al. ................. 126/263.07 |
| 6,341,602 B1 | * | 1/2002 | Fulcher .................... 126/263.07 |
| 6,484,514 B1 | | 11/2002 | Joseph et al. |
| 6,539,935 B2 | * | 4/2003 | Ichikawa et al. ......... 126/263.09 |
| 6,640,801 B2 | | 11/2003 | Sabin et al. |
| 7,093,599 B2 | | 8/2006 | Chen |
| 7,993,692 B2 | | 8/2011 | Finley et al. |
| 2003/0002912 A1 | | 1/2003 | Morpeth |
| 2003/0116452 A1 | * | 6/2003 | Saric et al. .................... 206/219 |
| 2006/0118434 A1 | | 6/2006 | Leiner et al. |
| 2006/0162344 A1 | | 7/2006 | Scudder et al. |
| 2006/0177411 A1 | * | 8/2006 | Gervasio ........................ 424/74 |
| 2007/0029334 A1 | * | 2/2007 | Bagley ........................... 220/705 |
| 2007/0125362 A1 | * | 6/2007 | Ford et al. ................. 126/263.08 |
| 2007/0184154 A1 | * | 8/2007 | Gerbeling et al. ............ 426/234 |
| 2007/0215496 A1 | | 9/2007 | Scarborough et al. |
| 2009/0032413 A1 | * | 2/2009 | Huber et al. .................. 206/221 |
| 2009/0152267 A1 | | 6/2009 | May et al. |

FOREIGN PATENT DOCUMENTS

| | | |
|---|---|---|
| JP | H01082179 U | 6/1989 |
| JP | H02018339 U | 1/1990 |
| JP | H02040339 U | 3/1990 |
| JP | H11239441 A | 9/1999 |
| JP | 3094458 Y | 10/2000 |

OTHER PUBLICATIONS

International Bureau, International Preliminary Report on Patentability Chapter I for International Application No. PCT/US2010/043217, Jan. 31, 2012, pp. 1-10, Geneva, Switzerland.

International Bureau, Written Opinion of the International Search Authority for International Application No. PCT/US2010/043217, Nov. 22, 2011, pp. 1-9, Geneva, Switzerland.

International Bureau, Informal Comments by Applicant on WO-ISA for International Application No. PCT/US2010/043217, Jan. 26, 2012, pp. 1-6, Geneva, Switzerland.

* cited by examiner

INSTANT SELF-HEATING CONTAINERS

CROSS-REFERENCE TO RELATED APPLICATIONS

This application is a continuation of U.S. application Ser. No. 13/387,213, now U.S. Pat. No. 8,561,792, entitled "Instant Self-Heating Containers." which is a United States national stage application of International Application no. PCT/US2010/043217 entitled "Instant Self-Heating Containers" and filed Jul. 26, 2010, which claims priority to U.S. provisional patent application No. 61/228,586 entitled "Instant Self-Heating Food and Beverage Container" and filed Jul. 26, 2009, and also to U.S. provisional patent application No. 61/228,592 entitled "Disposable Depilatory Wax Dispenser" and filed Jul. 26, 2009. The contents of the parent application PCT patent application and both of the United States provisional patent applications are incorporated herein by reference in their entirety as if set forth verbatim.

FIELD

The embodiments disclosed herein relate generally to self-heating containers, and in particular to instant self-heating containers for dispensing heated products.

BACKGROUND

One problem with most beverages, ready-to-eat foods, and other products that require heating is that they are not hot straight out of the container. Rather, they must be heated by external means. Although instant teas or soups can be heated by adding hot or boiling water to the container, this assumes that the user has access to a supply of hot water. Many times this is simply not true. For example, the user may be outdoors or otherwise without access to microwaves, stoves, electricity or heating fuel. Further, in emergency situations, instant access to heated beverages, food or other products may be vital to survival.

A related problem is found in the spa and beauty industries which make wide-spread use of heated waxes and resins to remove unwanted hair and hair follicles from various body parts, such the eyebrow, upper lip, arm pit, bikini line, legs, arms, and other areas of the body. For the purposes of this disclosure, the term "wax" or "resin" is understood to encompass any heated depilatory agent. In a typical wax depilating session, a bulk of wax or similar substance is heated by electrical means in a container, such as a can, tub, or pot. It can be difficult, particularly for a home user without access to specialized heating equipment, to heat and maintain the wax at the correct temperature without dangerously overheating it.

Once heated, the wax is applied to the hair and underlying skin by a spreader tool such as a tongue depressor or applicator. The heated wax is scooped up by the esthetician or home user via the applicator, and spread onto the treatment area in a sufficient amount and allowed to cool or congeal. Multiple dips into the heated wax container are needed to cover the treatment area. After cooling, the user grasps the hardened wax layer and quickly pulls the congealed wax off the skin, thus removing the hair away from the skin. In a soft wax application, the usage is very much the same except with the addition of a gauze or similar strip being applied over the wax as the carrier to lend dimensional stability to the wax as it is being pulled from the treatment area.

In all depilatory wax-based applications, sanitation is a concern as "double dipping" may occur or multiple contacts between the applicator, skin, and bulk wax. Specifically, when the applicator is used against the skin, dead skin cells, hair and debris, and potential pathogens stick to the wax on the applicator. When the operator reloads the applicator by scooping up additional wax from the bulk wax, the bulk wax can be subject to contamination from contact with the skin, dead skin cells, hair and debris on the applicator. In practice, cross contamination from multiple people has been a growing concern, as increased incidences of skin-related illnesses have been reported from "later" customers. For example, skin conditions such as impetigo, herpes simplex, ringworm, scabies, warts and many other conditions including afflictions derived from fungus, viruses, and bacteria can be communicated to later customers via the bulk wax container.

Another complication is that the bulk wax takes a significant period of time to heat, therefore, the treatment and disposal of contaminated wax can be a significant cost in both time and energy. Also, handling large quantities of wax can be a difficult matter, especially in view of the treatment and disposal concerns above.

To solve the various problems outlined above, many solutions have been proposed. For example, instant-hot beverages and soups have been provided in which the outer container includes an inner contents chamber (to hold the beverage, soup or other contents to be heated), a quick-lime chamber, and a water chamber. The user causes the water chamber to communicate with the quick lime chamber, and the combination of water and quick-lime gives rise to a fast exothermic reaction (for example, see U.S. Pat. No. 7,117,684 to Scudder et al.). While these known instant-hot containers provide the user with heated contents, they have drawbacks. First, the quick-lime and water reaction completes very quickly so that although the contents are initially hot, they begin to cool down as soon as the exothermic reaction completes, which may be a matter of only a few minutes. Second, the quick-lime exothermic reaction is extremely hot and can lead to contents that are dangerously hot and thus requires a container that can withstand extremely high temperatures. Finally, the quick-lime and water combination creates a hot slurry that can easily leak out of the container and cause burns unless a complicated one-way valve is provided that allows gas to escape but keeps the slurry inside the reaction area of the container.

Another significant problem with known instant self-heating containers is that the heated slurry tends to only contact the bottom of the contents chamber so that the contents at the bottom of the contents chamber are initially much hotter than the contents at the top of the chamber. Where the contents are dispensed from the top of the outer container, this means that the contents which leave the container first are coolest while the hottest contents remain at the bottom of the contents chamber.

Accordingly, it would be advantageous to provide an instant self-heating food and beverage container that has a long-lasting heat source so that the beverage or food can be maintained at a relatively constant elevated temperature for a relatively long duration of time. There is also a need for an instant self-heating container that dispenses the hottest contents first while allowing the cooler contents to continue heating. A need also exists for an instant self-heating container that heats the entire contents more quickly and uniformly. Similarly, there is a need for a way to rapidly and uniformly heat depilatory wax in single-use containers so that users can quickly apply hot wax without the need for a large container that is subject to contamination. Finally, it would also be advantageous to provide an instant self-heating container that can be made from relatively inexpensive, disposable materials.

SUMMARY

The instant self-heating containers disclosed below satisfy these needs. The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

In one embodiment, an instant self-heating container includes a first shell that has a target container containing contents to be heated, and an activator container containing an activator. The activator container has a bottom, and the activator container and the target container each have container walls preventing intermixing of the contents to be heated and the activator. A second shell is external to and nested with the first shell. The second shell includes a reaction chamber nested with the target container and an activator receiving chamber nested with the activator chamber and in fluid communication with the reaction chamber. A reactant is disposed in the reaction chamber and a piercer is disposed in the activator container of the first shell. When the piercer is actuated, such as by pushing it down by a user, the bottom of the activator container is pierced thereby placing the activator container in fluid communication with the activator receiving chamber and allowing activator to travel from the activator container into the activator receiving chamber and into the reaction chamber, where the activator combines with the reactant thereby causing an exothermic reaction in the reaction chamber that heats the contents to be heated in the target container.

The instant self-heating container may also include a contents cover sealing the contents to be heated inside the target container, the contents cover having at least a portion that is openable to provide access to the target container. The instant self-heating container may also have an activator cover sealing the activator inside the activator container. Further, the contents cover and the activator cover may be integral parts of a single container cover. If so, the first shell further may include a flat flange circumscribing the target container and the activator container, so that the single container cover is a peel-back cover adhered to the flat flange of the first shell.

The target container may have a bottom with at least one protrusion extending upwardly into the target container. Such a protrusion may be in the shape of a single ring, or of two or more concentric rings. The instant self-heating container may also include a second protrusion in the bottom of the target container in the shape of a second ring concentric with the first ring.

In another embodiment, an instant self-heating container has an outer housing with an open upper end and a closed lower end. A lid is attached to the open upper end of the outer housing and includes a dispenser aperture and an activator chamber. A piercer is disposed inside the activator chamber. A reactant is disposed inside the outer housing at the closed lower end of the housing. A contents container with a lower end and a sealed upper end is disposed inside the outer housing above the reactant. The contents container contains contents to be heated. A conduit is in fluid communication between the lower end of the contents container and the dispenser aperture of the lid. When the piercer is actuated, the activator chamber in the lid is pierced thereby permitting the activator to flow inside the outer housing and combine with the reactant at the closed lower end of the outer housing to cause an exothermic reaction that heats the contents to be heated in the contents container.

The lid may also include a vent for venting reaction gases from the outer housing. The lid may also include a hermetic seal that prevents the contents to be heated from escaping from the instant self-heating container prior to breaking the hermetic seal. The activator chamber of the lid may have a lower end comprising a thin film so that the activator chamber is pierced by pushing the piercer through the thin film. The activator chamber may also have a downwardly displaceable upper end that contacts the piercer at least when downward force is applied to the upper end of the activator chamber.

The contents container inside the outer housing may be a pouch, and the pouch have a lower end comprising nestable external and internal gussets. The internal gusset of the pouch may include at least one percolation aperture. The conduit connecting the lower end of the contents container to the dispenser aperture of the lid may be a straw or may be integrally formed as part of the contents container, particularly where the contents container is a pouch. The reactant at the lower end of the inside of the outer housing may be in direct contact with the lower end of the contents container. Alternatively, the reactant may be disposed inside a pouch in direct contact with the lower end of the contents container. The contents to be heated may be released from the contents container through the dispenser aperture in metered volumes.

In another embodiment, an instant self-heating container is particularly suitable for use as a depilatory wax dispenser. In this embodiment, an instant self-heating depilatory container includes an outer enclosure with an opening and an inner enclosure substantially interior to the outer enclosure and sealed around a periphery of the opening thereby forming an enclosed reaction cavity between the inner enclosure and the outer enclosure. The inner enclosure also includes a receiving cavity disposed inside the inner enclosure. The instant self-heating depilatory container also includes an activator well with an open end and a closed end, the closed end being in communication with the enclosed reaction cavity and providing a breachable passageway to the enclosed reaction cavity. A depilatory material is contained within the receiving cavity and a reactant is disposed within the enclosed reaction cavity, the reactant being activated by an activator contained within the activator well to generate an exothermic reaction when the activator is introduced into the enclosed reaction cavity via the breachable passageway to provide a regulated heating of the depilatory material.

The instant self-heating depilatory container may also include a removable seal enclosing the receiving cavity. The activator may be an electrolyte solution, water or other liquid. The activator well may be interior or exterior to the inner enclosure. An open tray may be connected to the outer enclosure. The breachable passageway may be breached by exerting a force to the closed end. An aromatic compound may be disposed in at least one of the reaction cavity and inner well. The depilatory compound may be wax-based or resin-based, without limitation. The inner enclosure may be donut-shaped, and the outer enclosure may be disposable.

In another embodiment, an instant self-heating container is particularly suitable for use as a heated contents dispenser. In this embodiment, an instant self-heating dispenser includes a flexible outer tube having a first end with a dispensing nozzle and an open second end. The outer tube contains contents to be heated. A flexible reaction vessel is disposed inside the outer tube and is in contact with the contents to be heated. The reaction vessel contains a reactant. A frangible activator vessel is disposed inside the reaction vessel and contains an activator. A cap is attached to the open second end of the outer tube and covers the reaction vessel and the open second end of the outer tube, and also includes a vent. Bending the outer tube causes the frangible activator vessel to rupture and release activator into the reaction vessel where the activator combines with the reactant and causes an exothermic reaction that heats the contents to be heated in the outer tube.

The contents to be heated in the flexible outer tube may be a depilatory wax, and there may be an applicator attached to the dispensing nozzle of the flexible outer tube. The applicator may include a roller, at least two parallel paddles, or a squeegee (flexible rubber blade). A membrane may be adhered over the vent in the cap to seal the reaction vessel, and the membrane may be adhered over the vent in the cap with a water-based adhesive that dissolves in steam produced by the exothermic reaction caused by combining the activator and the reactant in the reaction vessel. The reactant may be disposed in an elongate water permeable pouch inside the reaction vessel.

To the accomplishment of the foregoing and related ends, certain illustrative aspects are described herein in connection with the following description and the appended drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

DETAILED DESCRIPTION

The embodiments disclosed below address a need for a relatively inexpensive instant self-heating container that remains at an elevated temperature for a relatively long duration of time. In one embodiment, an instant self-heating container includes a first shell that has a target container containing contents to be heated, and an activator container containing an activator. The activator container has a bottom, and the activator container and the target container each have container walls preventing intermixing of the contents to be heated and the activator. A second shell is external to and nested with the first shell. The second shell includes a reaction chamber nested with the target container and an activator receiving chamber nested with the activator container and in fluid communication with the reaction chamber. A reactant is disposed in the reaction chamber and a piercer is mounted in the activator container of the first shell. When the piercer is pushed down by a user, the bottom of the activator container is pierced thereby placing the activator container in fluid communication with the activator receiving chamber and allowing activator to travel from the activator container into the activator receiving chamber and into the reaction chamber and combining with the reactant thereby causing an exothermic reaction in the reaction chamber that heats contents to be heated in the target container.

Figure 1:
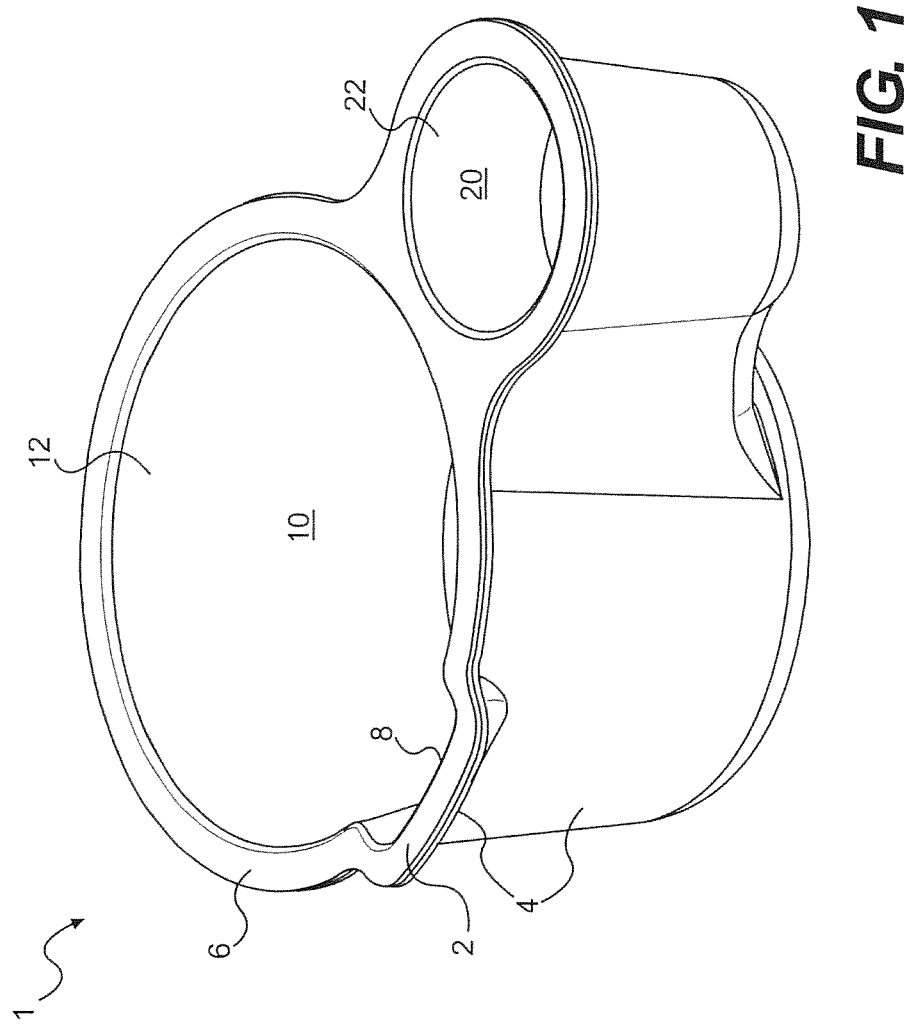
FIG. 1 is a perspective view of an instant self-heating container.

FIG. 1 shows one embodiment of an instant self-heating container. Self-heating container 1 includes first shell 2 and second shell 4. First shell 2 and second shell 4 are nested together and may or may not be bonded together. First shell 2 includes target container 10 which has target container walls 12. First shell 2 further includes activator container 20 which has activator container walls 22. Target container 10 contains the contents to be heated, which may be a beverage, food, or anything else desired to be heated. Activator container 20 contains activator 24 (see FIG. 2). Container walls 12 and 22 prevent intermixing of the contents to be heated and activator 24.

Figure 2:
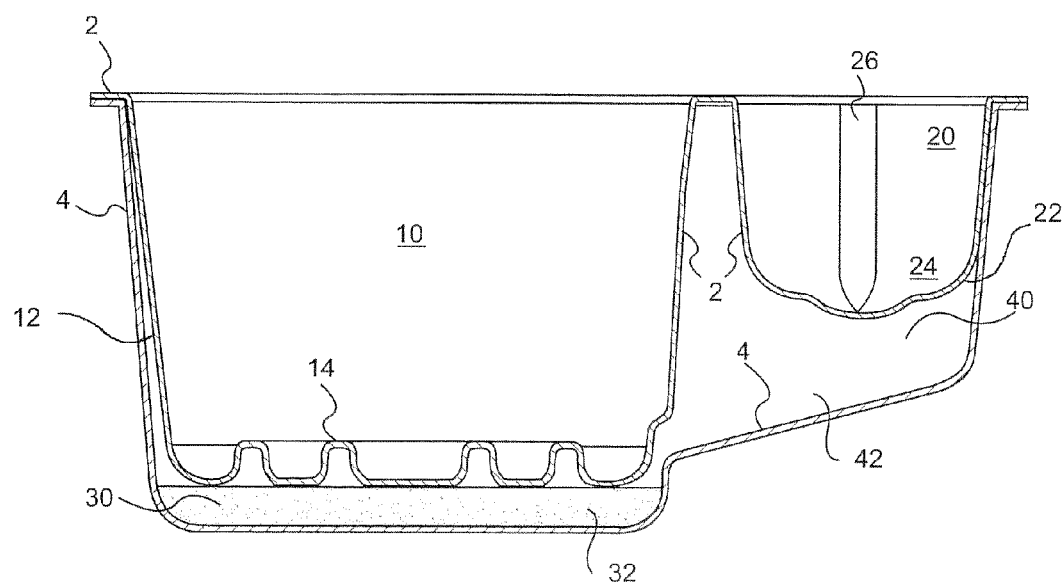
FIG. 2 is a front cross-sectional view of the instant self-heating container of FIG. 1.
Figure 3:
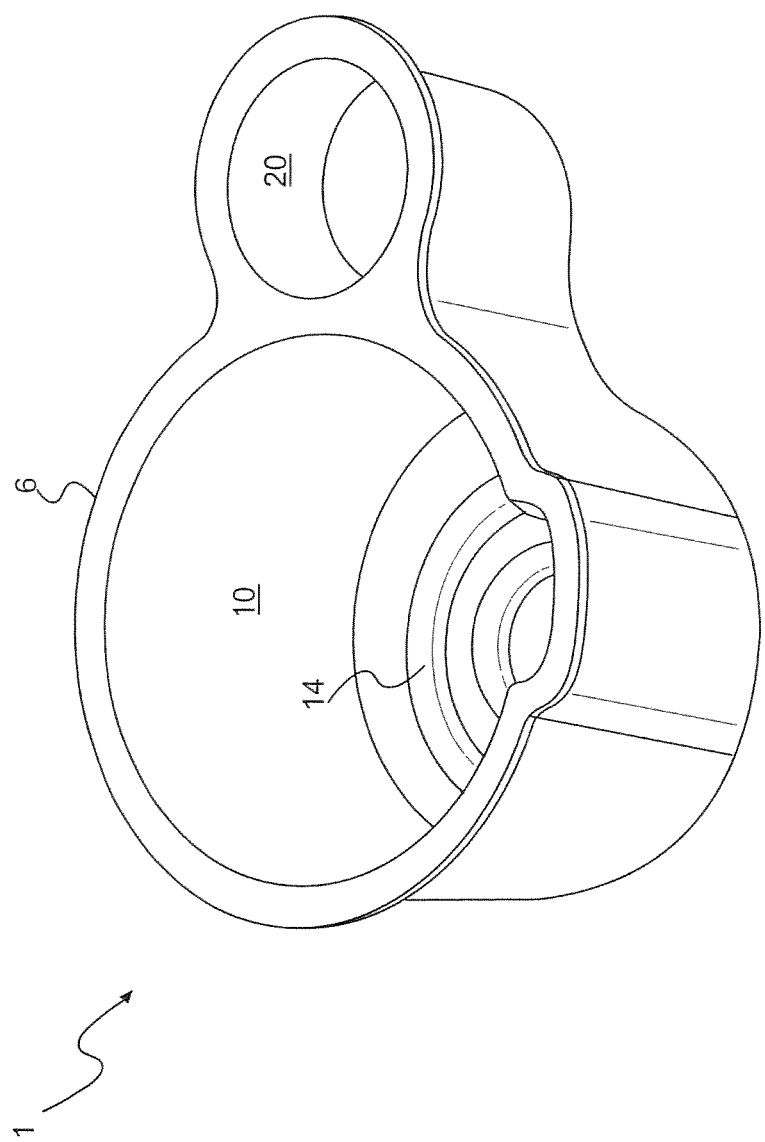
FIG. 3 is another perspective view of the instant-self heating container of FIG. 1.

As seen in FIG. 2, target container 10 has a bottom surface with one or more protrusions 14 which, in this embodiment, are in the form of concentric rings. FIG. 3 shows protrusions 14 from above, looking down into target container 10. Additionally, activator container 20 may include piercer 26, which in this embodiment is a rigid plastic spear. However, piercer 26 may not be included with self-heating container 1 as a user may use a knife, pen or other external instrument to pierce activator container (a process described more fully below). To prevent piercer 26 from puncturing second shell 4, second shell 4 may be made from a thicker and/or stronger material than the bottom of activator container 20. Additionally, the distance from the bottom of activator container 20 to second shell 4 may be sufficiently large that piercer 26 will not contact second shell 4 after being pushed by the user.

In an alternate embodiment (not depicted), the piercer may be replaced by other means for placing the activator container in fluid communication with the activator receiving chamber. For example, an external "pull string" may be connected to an internal "pull tab" such that once the string is pulled, the tab disengages and opens a hole in the activator container to allow fluid to exit the activator container into the activator receiving chamber.

Figure 4:
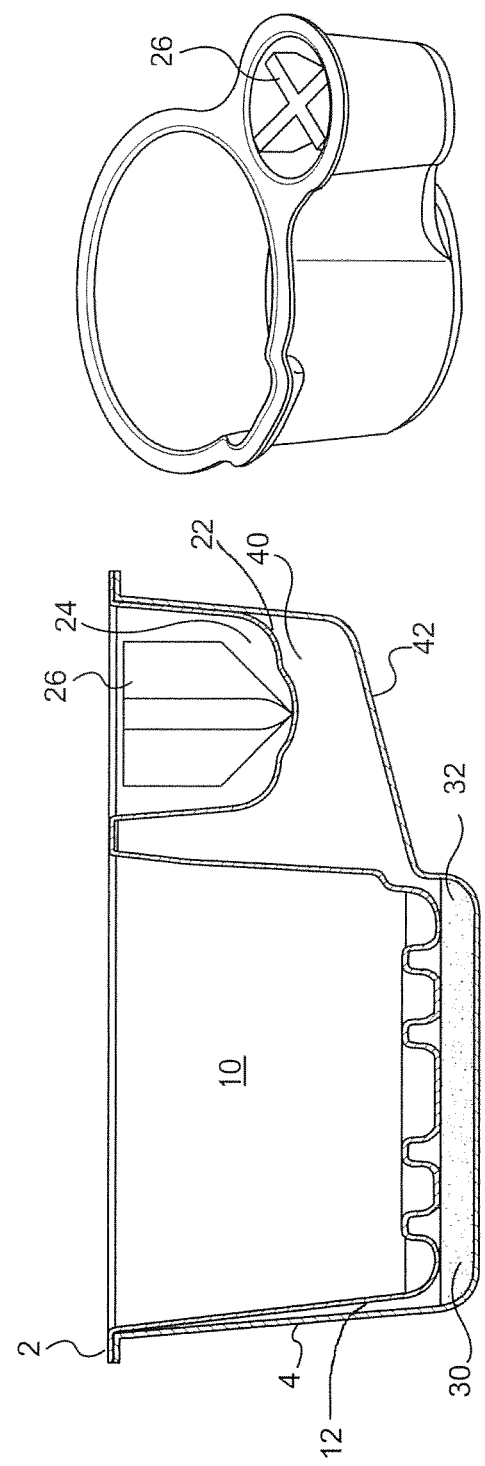
FIG. 4 shows an alternative embodiment of a piercer for an instant self-heating container.

In another embodiment, shown in FIG. 4, piercer 26 is a cross-shaped pointed member that spans the diameter of activator container 20. The upper end of piercer 26 is adjacent the upper end of activator container 20 so that a user can press down on it easily without removing any cover sealing activator container 20. The cross-shaped profile of piercer 26 serves to create a large hole in the bottom of activator container 20 so as to quickly empty all of the contents of activator container 20 without piercer 26 itself blocking the hole it creates.

Second shell 4 includes reaction chamber 30 containing reactant 32. Second shell 4 also includes activator receiving chamber 40. As can be seen, reaction chamber 30 and activator receiving chamber 40 are in fluid communication with one another via spillway 42. It can thus be seen that when a user pierces the bottom of activator container 20 by pushing down on piercer 26 (or by using an external implement), activator 24 will travel into activator receiving chamber 40, down spillway 42, and into reaction chamber 30 where it will contact reactant 32 and set off an exothermic reaction.

Reactant 32 and activator 24 may be any chemicals that, when combined, undergo an exothermic reaction. Examples of exothermic reactions that can be used to heat target container 10 include the combination of water with strong acids, combining alkalis and acids, polymerization, thermite reaction, aluminum-based reactions, magnesium-iron-based reactions, anhydride-based reactions, and so forth. One particularly suitable, non-toxic exothermic composition is Lava Gel® (manufactured by Forever Young International, Inc, Escondido, Calif., USA) which is known to exhibit a very controlled temperature for an extended period of time, with simply the addition of water or an electrolyte solution, such as saline water (as the activator). However, other reactants may be used, according to design preference, including reactants that require activation or moderation by more than one activator compound or element.

Thus, in this embodiment, when the user pierces activator container 20, activator 24 flows out of activator container 20, down spillway 42, and into reaction chamber 30. The powder mixture turns into a heat-producing gel as reactant 32 and activator 24 simultaneously begin to undergo an exothermic reaction. Thus, reaction chamber 30 fills with an exothermic gel.

The use of an exothermic gel, such as Lava Gel, provides important advantages. Where activator 24 is water, the gel sequesters the water so that it cannot leak out of the reaction chamber 30. Thus, the need for a complex valve that allows gas to escape from reaction chamber 30 without allowing liquid to escape is eliminated. The exothermic gel is so viscous that it cannot leak out of the opening created by piercer 26 in activator container 20, even though gases such as steam can still escape.

The exothermic gel expands (relative to the volume of the dry powder mixture) and oozes up the sides of target container 10 between first shell 2 and second shell 4. The gel also expands into cavities underneath protrusions 14. Thus, the exothermic gel contacts the outer surface of target container 10 over a very broad surface area. This allows the exothermic gel to quickly and evenly heat target container 10. In an alternative embodiment, protrusion 14 may be embossed lettering such as a logo, or a cylindrical or conical protrusion extending vertically upward into target container 10, optionally all the way up to the top of target container 10 such that target container 10 is annular.

Returning to FIG. 1, first shell 2 also includes peripheral flange 6. Peripheral flange 6 provides a flat surface for an adhesive foil cover to be adhered to first shell 2, thereby sealing the contents to be heated inside target container 10 and activator 24 inside activator container 20. First shell 2 may also include spout 8 to aid drinking from target container 10 where the contents to be heated are a beverage or soup. The adhesive foil cover may have a small peel-back portion over spout 8 so that only a small portion of target container 10 is uncovered when the contents to be heated are consumed or poured out.

The contents inside target container 10 may be anything at all, including foods and non-foods. In one embodiment, the contents to be heated are liquid herbal tea. In this embodiment, which is particularly well suited for use in spas, activator container 20 may contain aromatherapeutic oils. These oils will flow into reaction chamber 30 along with activator 24 and therefore are heated by the exothermic reaction between activator 24 and reactant 32. This heating of the oils causes them to release beneficial aromatherapeutic vapors that help to relax the tea drinker. Alternatively, or in addition, aromatherapeutic or perfume particles may be included in reaction chamber 30 so as to release aromatherapeutic gases during the exothermic reaction.

First and second nested shells 2 and 4 provide self-heating container 1 with a relatively simple construction. Either or both of shells 2 and 4 can be made from molded plastics such as polyethylene or polypropylene or other polymers. This means that self-heating container 1 can be manufactured very inexpensively so that self-heating container 1 may be disposable. Also, one or more of the shells 2, 4 may be manufactured from water resistant paper, plastic, metals, and so forth. In some embodiments, one or more of the shells 2, 4 may also be biodegradable. Further, particularly where Lava Gel™ is the reactant used, there is no danger of self-heating container 1 melting because the reacting chemicals do not attain dangerously high temperatures. Additionally, the heat of the exothermic reaction continues for a relatively long time, from 15 minutes to an hour or more, when Lava Gel™ is the reactant used. Thus, not only do the contents of target container 10 stay warm for an extended period of time when compared to existing self-heating devices, self-heating container 1 itself can be used as a hand-warmer after the contents to be heated have been consumed or disposed of.

It is to be understood that self-heating container 1 may have a wide variety of shapes and sizes. For example, the containers are not necessarily round and may be rectangular or polygonal. The dimensions may vary widely from only 1-2 inches in length and/or height to several feet in length and/or height, and any size in between. In particular, it should be noted that the dimensions shown in FIG. 2 are just one possible example of the dimensions of self-heating container 1 and should in no way be taken as limiting.

Figure 5:
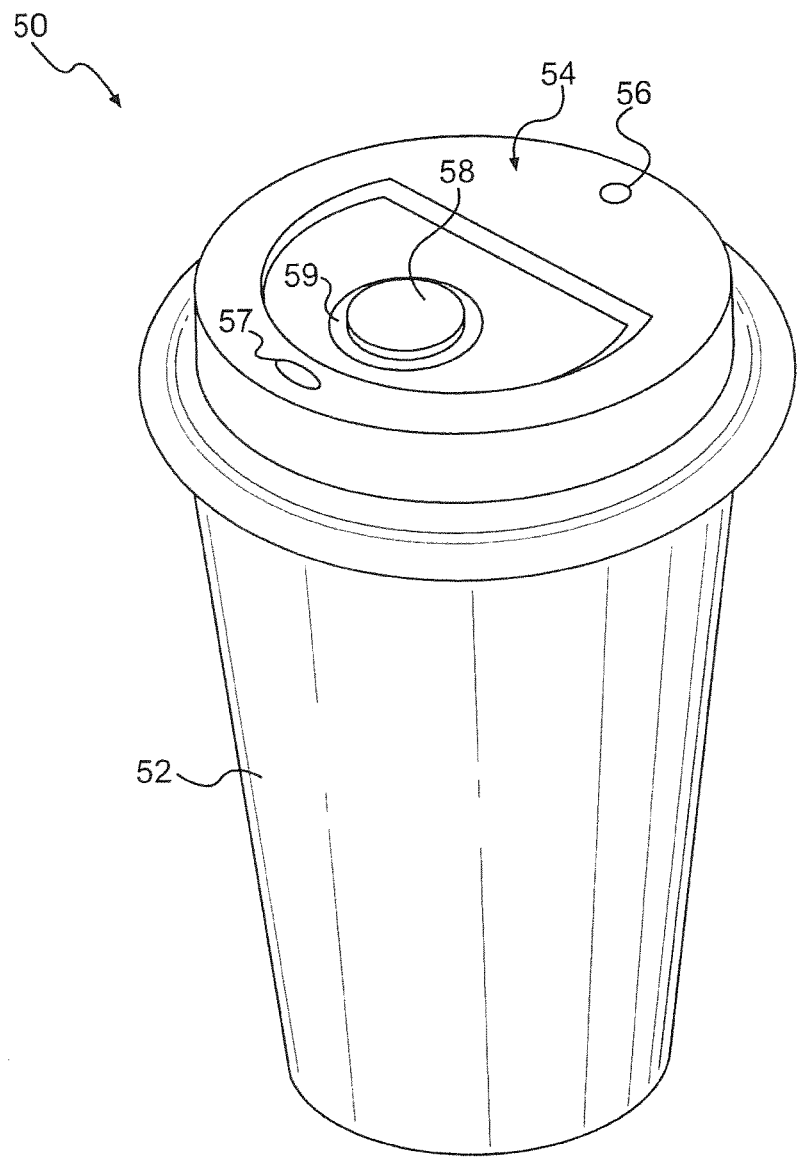
FIG. 5 is a perspective view of another embodiment of an instant self-heating container.

Another embodiment of an instant self-heating container is shown in FIGS. 5 and 6. Instant self-heating container 50 includes outer housing 52 which has an open upper end and a closed lower end. Lid 54 is attached to the open upper end of outer housing 52 and may be permanently bonded to housing 52 by thermal or ultrasonic welding, adhesives, or any other suitable means. Lid 54 includes dispenser aperture 56 (which may be surrounded by a drinking well depression in the upper surface of lid 54) and vent 57, both of which are in fluid communication with the interior volume of outer housing 52. Lid 54 also includes activator chamber 58 which is surrounded by moat 59.

Figure 6A:
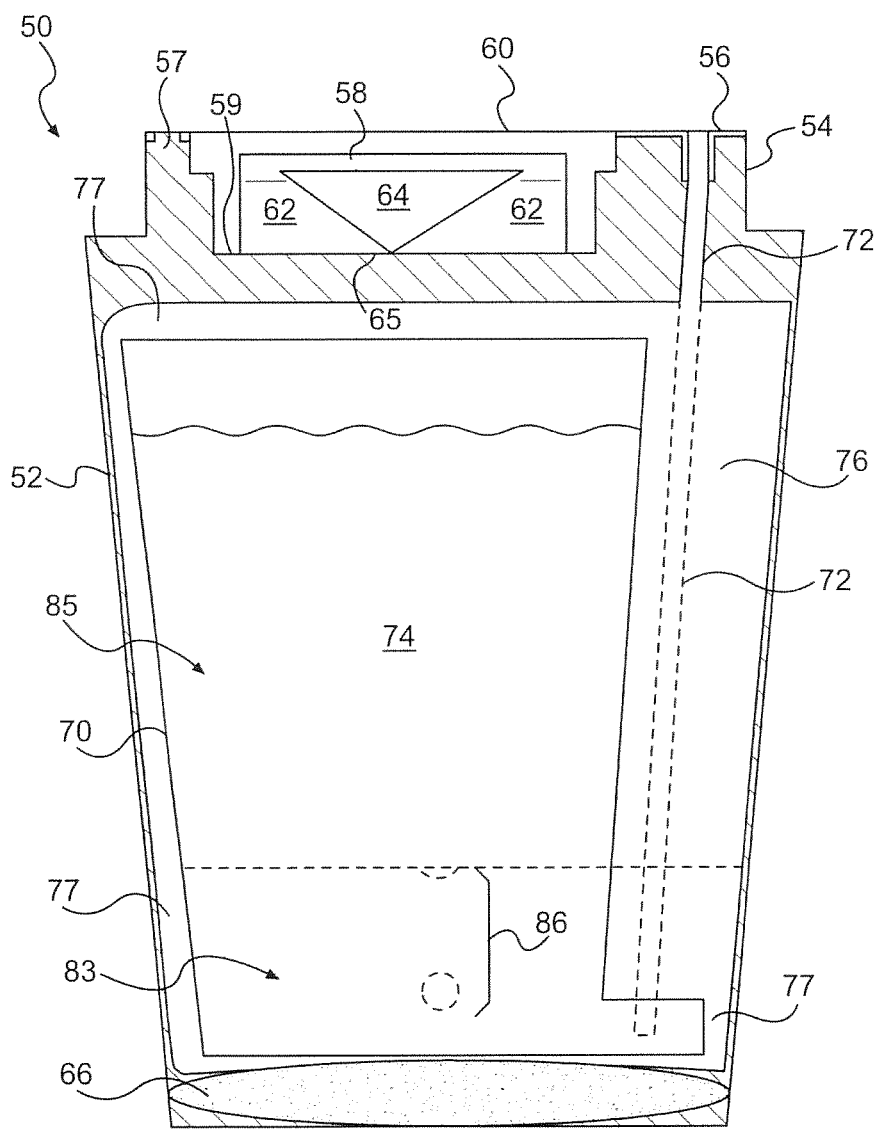
FIG. 6A is a cross-sectional view of the instant self-heating container of FIG. 5.
Figure 6B:
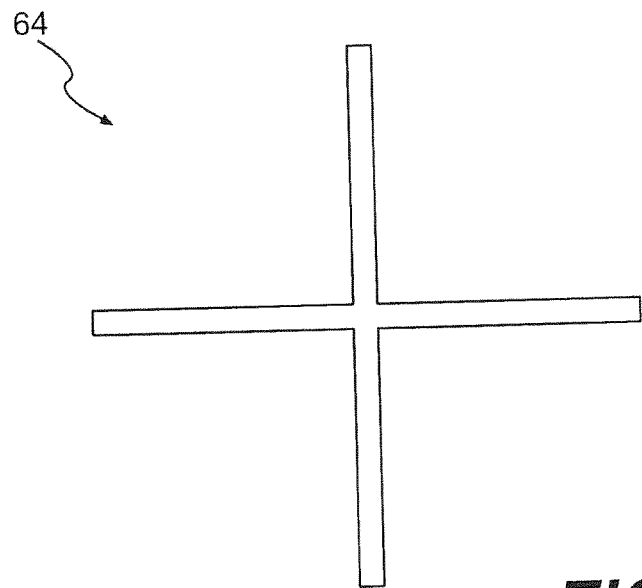
FIG. 6B is a top plan view of a piercer used in the instant self-heating container of FIG. 5.
Figure 6C:
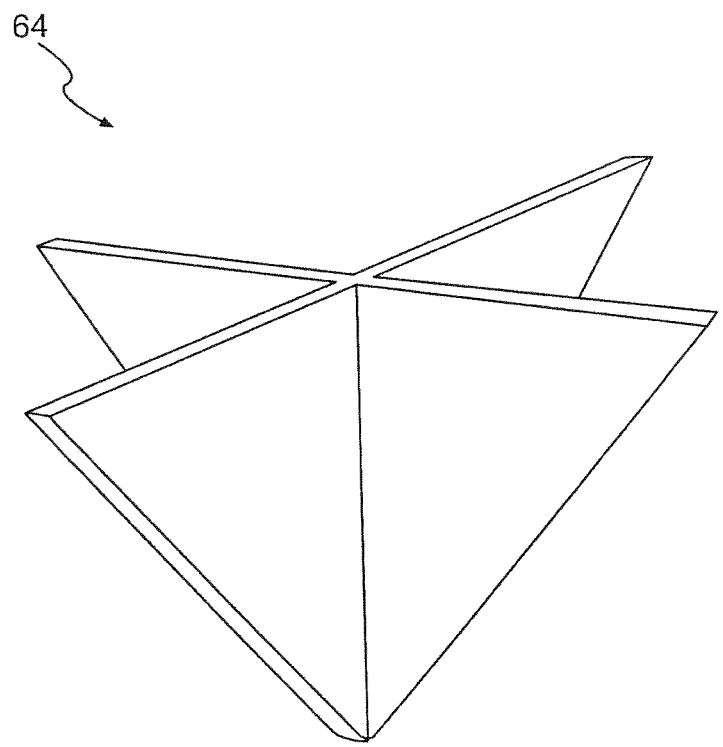
FIG. 6C is a perspective view of the piercer of FIG. 6B.

As best shown in FIG. 6A, which is a cross-sectional view of instant self-heating container 50 taken along the vertical plane passing through the centers of dispensing aperture 56, vent 57, and activator chamber 58, activator chamber 58 contains activator 62 and piercer 64. Activator 62 is retained within activator chamber 58 by membrane 65, which may be a thin foil adhered to the undersurface of moat 59 so as to stretch across the bottom of activator chamber 58 thereby forming a sealed lower end of activator chamber 58. Activator chamber 58 also contains piercer 64 which is a relatively sharp object capable of piercing membrane 65 when downward pressure is applied externally to the upper surface of activator chamber 58 so as to urge piercer 64 against membrane 65. Piercer 64 may be free-floating within activator chamber 58 or may be integrally formed therewith. Piercer 64 is shown in greater detail in FIGS. 6B and 6C. As can be seen, piercer 64 has a cross-shaped profile and is pointed at its lower end and flat at its upper end. This shape of piercer 64 is particularly advantageous because it cleanly ruptures membrane 65 without self-sealing the rupture formed in membrane 65. This ensures that all of activator 62 will be released from activator chamber 58.

Continuing with FIG. 6, hermetic seal 60 covers the entire upper end of lid 54. As dispensing aperture 56 and vent 57 are the only paths of fluid communication between the interior of outer housing 52 and the atmosphere, hermetic seal 60 prevents any of the contents of outer housing 52 from escaping prior to activation of self-heating container 50 by a user. Hermetic seal 60 may be a thin foil adhered to the upper surface of lid 54, and may include a pull tab to assist a user in removing hermetic seal 54.

As also shown in FIG. 6, outer housing 52 contains reactant 66 which, in the illustrated embodiment, is shown contained within a permeable pouch. However, reactant 66 may also be free-floating within outer housing 52. Outer housing 52 also contains contents container 70 which contains the substance to be heated, hereinafter referred to as contents 74. Contents 74 may be a beverage, soup, or any other liquid including non-food liquids which require heating. In the illustrated embodiment, contents container 70 is a pouch with a gusseted bottom and is sealed around its periphery by peripheral seal 77.

Figure 7:
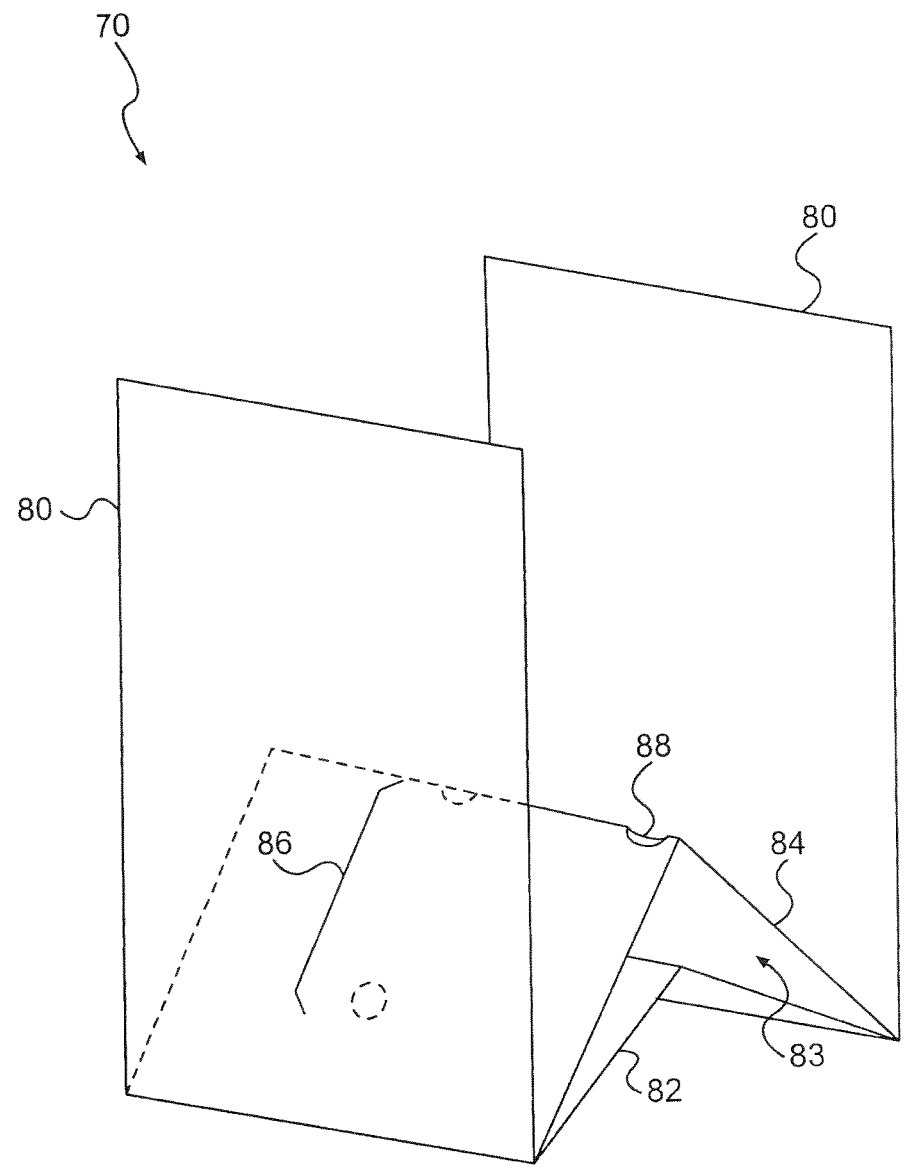
FIG. 7 is a perspective view of a contents container pouch of the instant self-heating container of FIG. 5, shown prior to full assembly.
Figure 8:
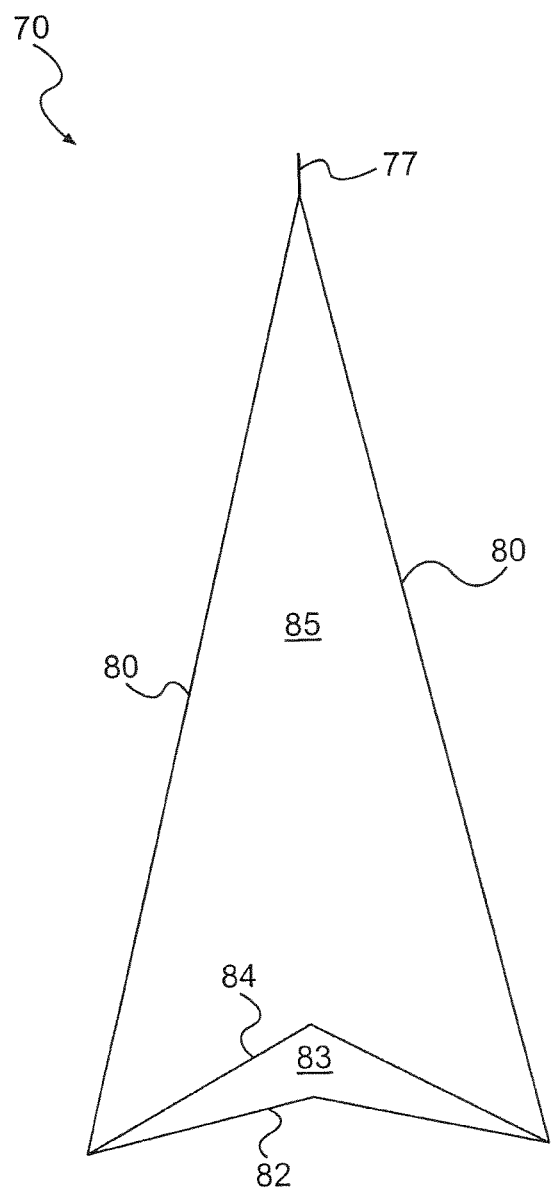
FIG. 8 is a cross-sectional profile view of the middle of a contents container pouch of the instant self-heating container of FIG. 5.

The construction of one embodiment of contents container 70 is shown in greater detail in FIGS. 7 and 8. In this embodiment, contents container 70 is a pouch. FIG. 7 shows contents container 70 prior to bonding together external panels 80 along peripheral seal 77 to form the pouch. FIG. 8 shows a profile cross-sectional view of the middle of contents container 70 after external panels 80 have been bonded together along peripheral seal 77. As seen in FIGS. 7 and 8, the bottom of contents container 70 comprises two nestable gussets, outer gusset 82 and inner gusset 84. As used herein, the term "nestable" means that when contents container 70 is evacuated, inner gusset 84 can fold over and nest with outer gusset 82. The presence of inner gusset 84 inside contents container 70 divides contents container 70 into lower chamber 83 and upper chamber 85. Inner gusset 84 also includes one or more percolation apertures 86 which allow fluid communication between upper chamber 85 and lower chamber 83 for a purpose to be described below. The number and size of percolation apertures 86 is not critical, but in one embodiment there are three percolation apertures 86 which are each approximately 0.45 cm in diameter. However, if more percolation apertures 86 are provided, each would be smaller in diameter. Conversely, if fewer percolation apertures 86 are provided, each would be larger in diameter.

Contents container 70 also includes conduit 72 disposed in conduit seal 76, which is essentially a widened portion of peripheral seal 77. Conduit 72 may be a separate tube or straw which is embedded and sealed into conduit seal 76, or conduit 72 may be a passageway that is integrally formed as part of contents container 70, particularly where contents container 70 is a pouch. As the lower end of conduit 72 extends below the bottom of conduit seal 76, the lower end of conduit 72 is unsealed and is in contact with contents 74 in lower chamber 83 of contents container 70. The upper end of conduit 72 extends above the upper end of conduit seal 76 and is bonded to dispenser aperture 56. The bond between the upper end of conduit 72 and dispenser aperture 56 is impermeable to liquids and gases. Thus, conduit 72 is the only path of fluid communication between the interior of contents container 70 and the atmosphere (via dispensing aperture 56).

Activator 62 and reactant 66 are substances which, when combined, produce an exothermic reaction. In one embodiment, activator 62 is fresh water or an electrolyte solution and reactant 66 is Lava Gel. As mentioned above in reference to the first-disclosed embodiment of an instant self-heating container, instant self-heating container 10, other known exothermic reactants may also be used according to design preferences.

To combine activator 62 and reactant 66, a user removes hermetic seal 60 from lid 54 and then applies downward pressure to the upper surface of activator chamber 58. The upper surface of activator chamber 58 comprises a flexible material so that it is displaceable from a neutral position to a lowered position. In other words, when a user applies downward force to the upper surface of activator chamber 58, the upper surface "oil cans" downward. This downward displacement of the upper surface of activator chamber 58 causes it to contact piercer 64 and urge it against membrane 65. If sufficient force is applied, piercer 64 will cause membrane 65 to rupture thereby releasing activator 62 into the interior of outer housing 52 where it is free to flow downward around contents container 70 until it contacts reactant 66 at the bottom of outer housing 52. One advantage of using Lava Gel as reactant 66 is that a very small volume of activator solution (on the order of 10-15 mL) is sufficient to fully complete the reaction (more or less activator solution could be used depending on the application). As the required volume of activator 62 is so small, activator chamber 58 can be commensurately small and conveniently located on lid 54. Once the exothermic reaction begins, reaction gases are free to escape through vent 57 of lid 54 to prevent buildup of pressure inside outer housing 52.

It can be seen in FIG. 6 that reactant 66 is in direct contact with the bottom of contents container 70. Thus, once activator 62 and reactant 66 are combined and undergo an exothermic reaction, contents 74 at the bottom of contents container 70 in lower chamber 83 will be heated first while contents 74 at the top of contents container 70 in upper chamber 85 will initially remain at their original temperature until warmed by intermixing and convection. For this reason, providing conduit 72 as the only path of fluid communication between contents container 70 and dispensing aperture 56 provides an important advantage. As the lower end of conduit 72 is in contact with contents 74 inside lower chamber 83 of contents container 70, the hottest portion of contents 74 is first to travel through conduit 72 to dispensing aperture 56. In practical terms, this means that when a user activates self-heating container 50, the user is not required to wait for all of contents 74 to become hot. Rather, assuming contents 74 is a consumable liquid, the user's "first sip" will be hot even though contents 74 in upper chamber 85 are not yet fully heated. If conduit 72 instead had its lower end in upper chamber 85 of contents container 70, the user would have to wait several minutes for contents 74 to become fully heated.

Another advantage of this configuration of conduit 72, lower chamber 83 and upper chamber 85 is that it provides functionality hereinafter referred to as "metered dispensing." As mentioned above, conduit 72 is the only path of fluid communication between the interior of contents container 70 and dispenser aperture 56. In other words, the interior of contents container 70 is otherwise completely sealed. Thus, when a user tips over self-heating container 50 in order to take a sip (or otherwise dispense contents 74), the liquid contents 74 will travel from lower chamber 83 through conduit 72 and out dispenser aperture 56 due to the force of gravity. This evacuation of contents 74 from lower chamber 83 causes the air pressure inside contents container 70 to lower in an amount proportional to the volume of contents 74 that escapes. Eventually, this lowered air pressure inside contents container 70 causes the flow of contents 74 through conduit 72 to cease. In some embodiments, the volume of contents 74 required to escape before flow ceases is on the order of 15-30 mL, which is the approximate volume of lower chamber 83 and is a convenient "sip size" for most users if contents 74 are lukewarm. However, if contents 74 are at their maximum temperature (for example, approximately 70° C.), a user is likely to sip a much smaller volume of contents 74, for example on the order of 1-3 mL. Of course, smaller and larger sip size volumes are also contemplated. Once the sip is complete and the user removes his or her mouth from dispensing aperture 56 and returns self-heating container 50 to its upright vertical position, air is permitted to travel from the atmosphere down conduit 72 and into contents container 70, thereby equalizing the air pressure and readying self-heating container 50 for the next sip.

As the metered volume of contents 74 leaves lower chamber 83 via conduit 72, contents 74 flow from upper chamber 85 through percolation apertures 86 into lower chamber 83 to replace the contents 74 dispensed during the previous sip. Thus, after each sip, additional contents 74 are "trapped" in lower chamber 83 where they are quickly heated by the exothermic reaction beneath contents container 70. In this way, each sip the user takes is freshly heated and comprises the hottest portion of contents 74 in contents container 70.

The materials used to make instant self-heating container 50 are not critical. However, outer housing 52 may be made from paper such as post-consumer recycled paper, foams such as expanded polyethylene or polypropylene, or plastics such as polyethylene or polypropylene. Lid 54 and conduit 72 may be made from any suitable plastic such as polypropylene, polystyrene, or polyethylene. Contents container 70 may be a pouch made from a thin metal foil laminated in plastics such as polypropylene or polyethylene and polyester acetate or the like.

Figure 9:
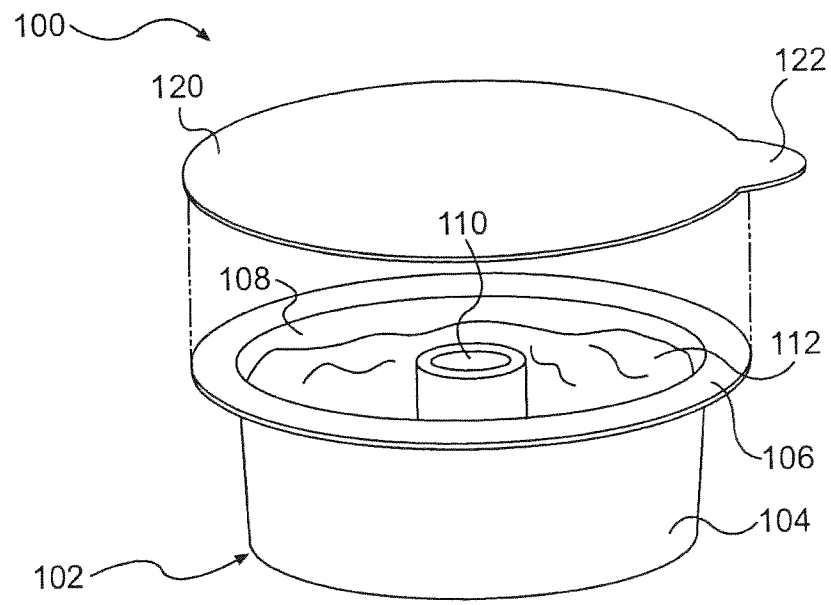
FIG. 9 is a perspective view of one embodiment of an instant self-heating depilatory container.

Now turning to FIGS. 9-19, a third embodiment of an instant self-heating container will now be described. This embodiment of an instant self-heating container is particularly advantageous for use as a depilatory wax dispenser that solves the problems disclosed above. FIG. 9 is a perspective view of an exemplary disposable depilatory wax dispenser 100. The exemplary dispenser 100 comprises a container 102 having an outer wall 104, lip 106, inner wall 108, and activator well 110. Depilatory material 112 is disposed between inner wall 108 and activator well 110. Exothermic reactant material (not shown) is placed in the exothermic reactant cavity (see FIG. 11, for example) formed between outer wall 104 and inner wall 108. The activator well 110 provides a controlled access portal to the exothermic reactant, wherein the activator is disposed into a passageway or channel formed between the activator well 110 and the exothermic reactant cavity to activate the exothermic reactant.

The upper surface of container 102 is sealed by sealing membrane 120 having a tab 122. When using the exemplary dispenser 100, sealing membrane 120 is removed from container 102 by pulling or lifting tab 122 from lip 106. Modes for attaching the sealing membrane 120 to lip 106 or to some surface of container 102 to seal/protect the interior of container 102 are well known in the art, as well as modes for removal. Therefore, these features are not further elucidated herein.

It should be understood that while FIG. 9 illustrates container 102 as forming a donut-like receiving cavity between inner wall 108 and center well 110, container 102 may be alternatively shaped. For example, the receiving cavity housing the depilatory material 112 may be horseshoe-shaped or rectangular, or other volumetric shapes which function to house the material 112 and allow distributed heating of the material 112, as further discussed below. As such, numerous other shapes are contemplated herein, with the donut-like cavity being currently considered as an efficient design for heat distribution. Therefore, changes and modifications may be made to the shapes, sizes, proportions of the illustrated embodiments without departing from the spirit and scope of this disclosure.

Figure 10:
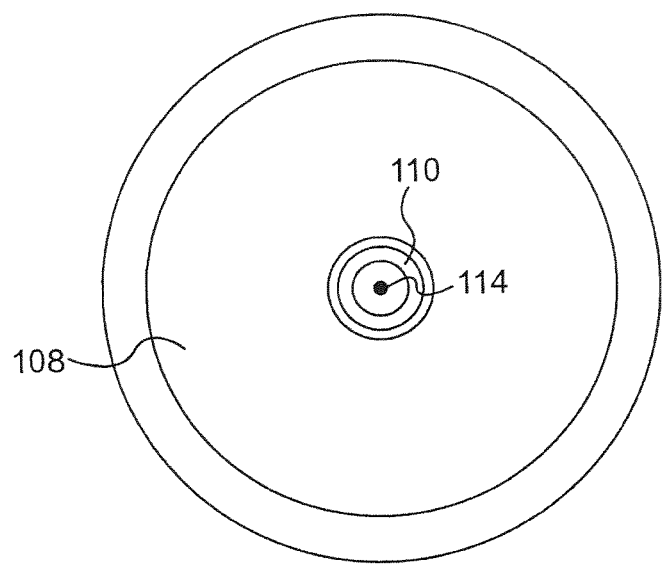
FIG. 10 is a top view of the instant self-heating depilatory container of FIG. 9.

FIG. 10 is a top side view of the exemplary dispenser of FIG. 9, with sealing membrane 120 removed. Activator well 110 can be formed with an interior depression 114 that provides a cavity for housing the activator as shown in FIG. 11.

Figure 11:
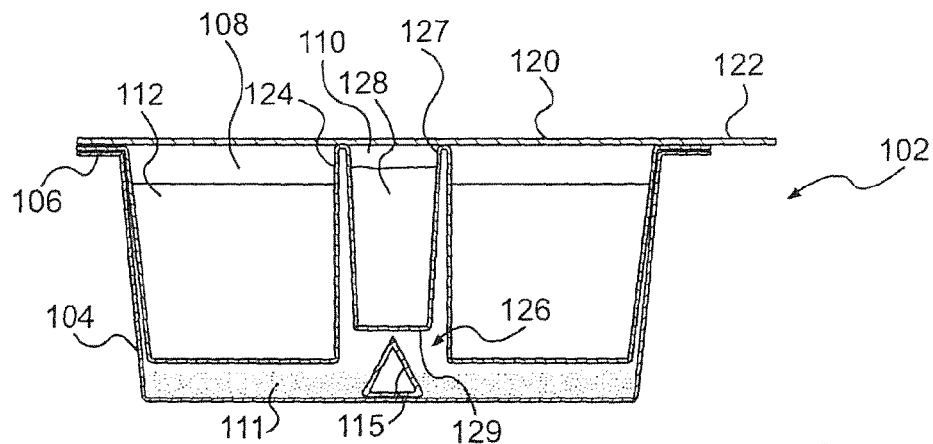
FIG. 11 is a cross-sectional side view of the instant self-heating depilatory container of FIG. 9.

FIG. 11 is a cross-sectional side view of the exemplary dispenser of FIG. 9. In FIG. 11, a liquid activator 128 is shown in activator well 110. The base of inner well 129 is positioned directly above a dart 115 inside cavity 126 which is formed between interior wall 124 and outer wall 104. The cavity 126 is of sufficient volume to contain exothermic reactant 111 and, if needed, is large enough to allow expansion of exothermic reactant 111 during activation.

Figure 12:
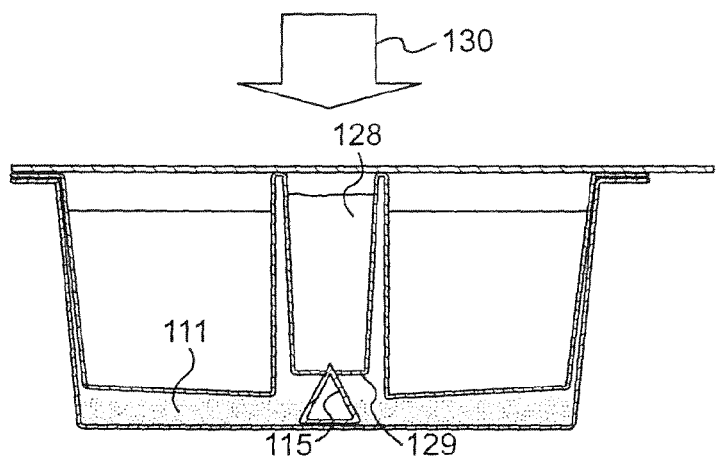
FIG. 12 is a cross-sectional side view of the instant self-heating depilatory container of FIG. 9, with a downward force being applied.

FIG. 12 is another cross-sectional side view of the exemplary dispenser of FIG. 9, being activated. Specifically, a downward force (depicted by the arrow 130) will cause base of inner well 129 to be ruptured via contact with dart 115.

Figure 13:
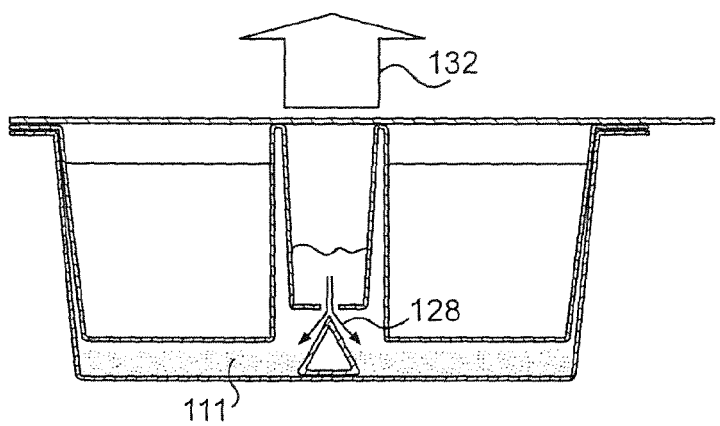
FIG. 13 is a cross-sectional side view of the instant self-heating depilatory container of FIG. 9, after the downward force is released.

As illustrated in FIG. 13, with an upward or returning force (depicted by the arrow 132), the rupture will significantly open, allowing the activator 128 to easily proceed into cavity 126 and mix with exothermic reactant 111 to activate the exothermic reaction. The shape of dart 115 can be designed to evenly distribute activator 128 in surrounding exothermic reactant 111, if so desired. Accordingly, in various embodiments, the dart 115 may be configured with a different shape than shown herein, and may also be disposed above or below the base of inner well 129.

Other means for breaching the passageway between the exothermic reactant cavity and the well are also contemplated, such as combination "pull strings" and "pull tabs", accessible plugs, and the like.

Figure 14:
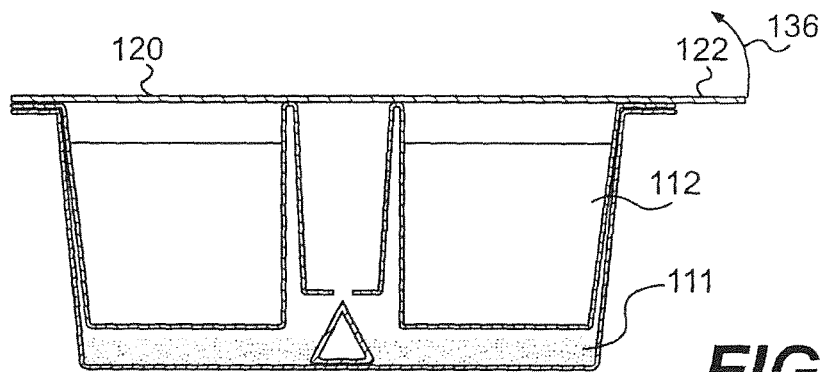
FIG. 14 is a cross-sectional side view of the instant self-heating depilatory container of FIG. 9 with the sealing membrane removed.

The operator can then remove sealing membrane 120 by, for example, pulling on tab 122 as shown in FIG. 14 to expose material 112. With a suitably activated exothermic reactant 111, depilatory material 112 can be quickly raised to a desired temperature and sufficiently maintained at that temperature for application by the user.

Figure 15A:
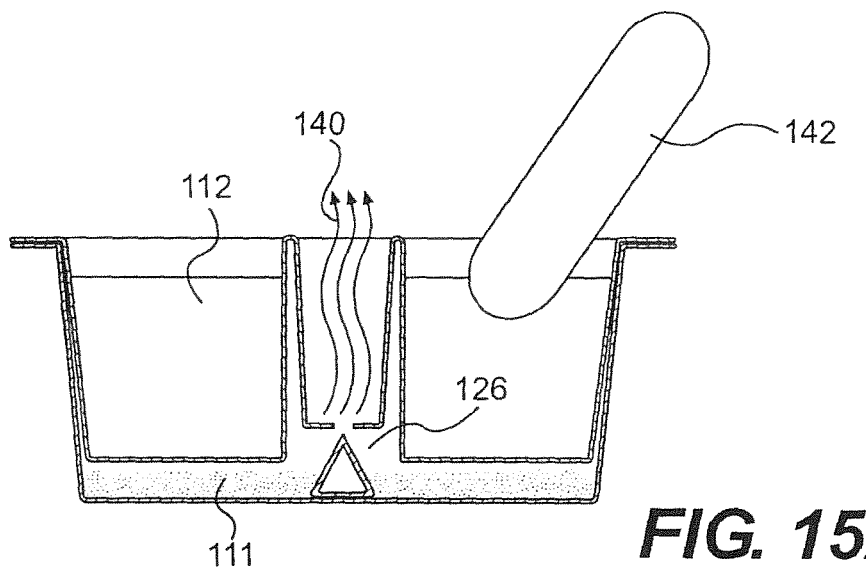
FIG. 15A-B are cross-sectional side views of the instant self-heating depilatory container of FIG. 9 in use.

FIG. 15A shows applicator 142 in liquefied wax 112 and how exhaust gases 140 from exothermic material 111 (e.g., water vapor, exothermic by-products, etc.) are vented through the ruptured base of the inner well 129, allowing pressure to be released. The release of pressure is significant as gases are typically produced from the exothermic reaction and their venting from cavity 126 is critical in maintaining the structural integrity of container 102. In some embodiments, it may be desirable to add fragrances or essential oils or scents to the venting exhaust gasses 140, either in cavity 126 or as elements in the activator 128. Therefore, with such additional elements, aromatherapy can also be effected as part of the depilatory session.

Figure 15B:
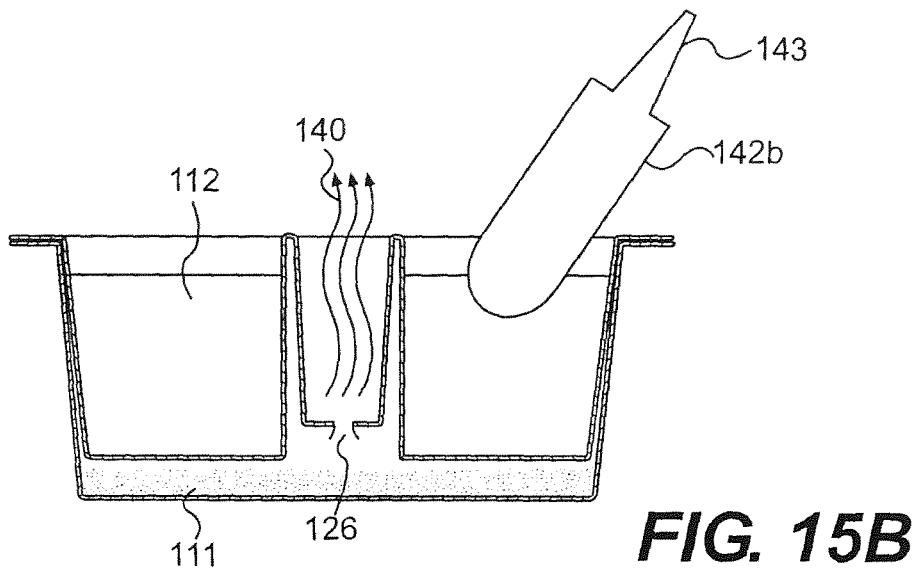

FIG. 15B shows another embodiment wherein the passageway between the exothermic reactant cavity 126 and the top and bottom of the activator well 110 can be breached by use of an applicator 142b having a pointed end 143. This embodiment obviates the need for the dart 115 shown in the above examples. This exemplary embodiment can be activated by pressing the pointed end 143 of the applicator 142b into the top of the activator well 110 (thereby breaking the seal 120, above the activator well 110) and pressing the applicator 142b down into the bottom 129 of the activator well 110, to breach the passageway to the exothermic cavity 126. A feature of this embodiment is that venting exhaust gases 140 can vent through the broken seal 120, prior to removal of the rest of seal 120 from the dispenser.

As should be apparent, the various materials for the container 102 should be resistant to high temperatures. Of course, depending on the type and regulation of the exothermic reactant 111 and the type of depilatory material 112 being used, the temperature may be sufficiently low enough to not require a high temperature resistant material. Accordingly, various combinations of materials may be used without departing from the spirit and scope of this disclosure.

Figure 16:
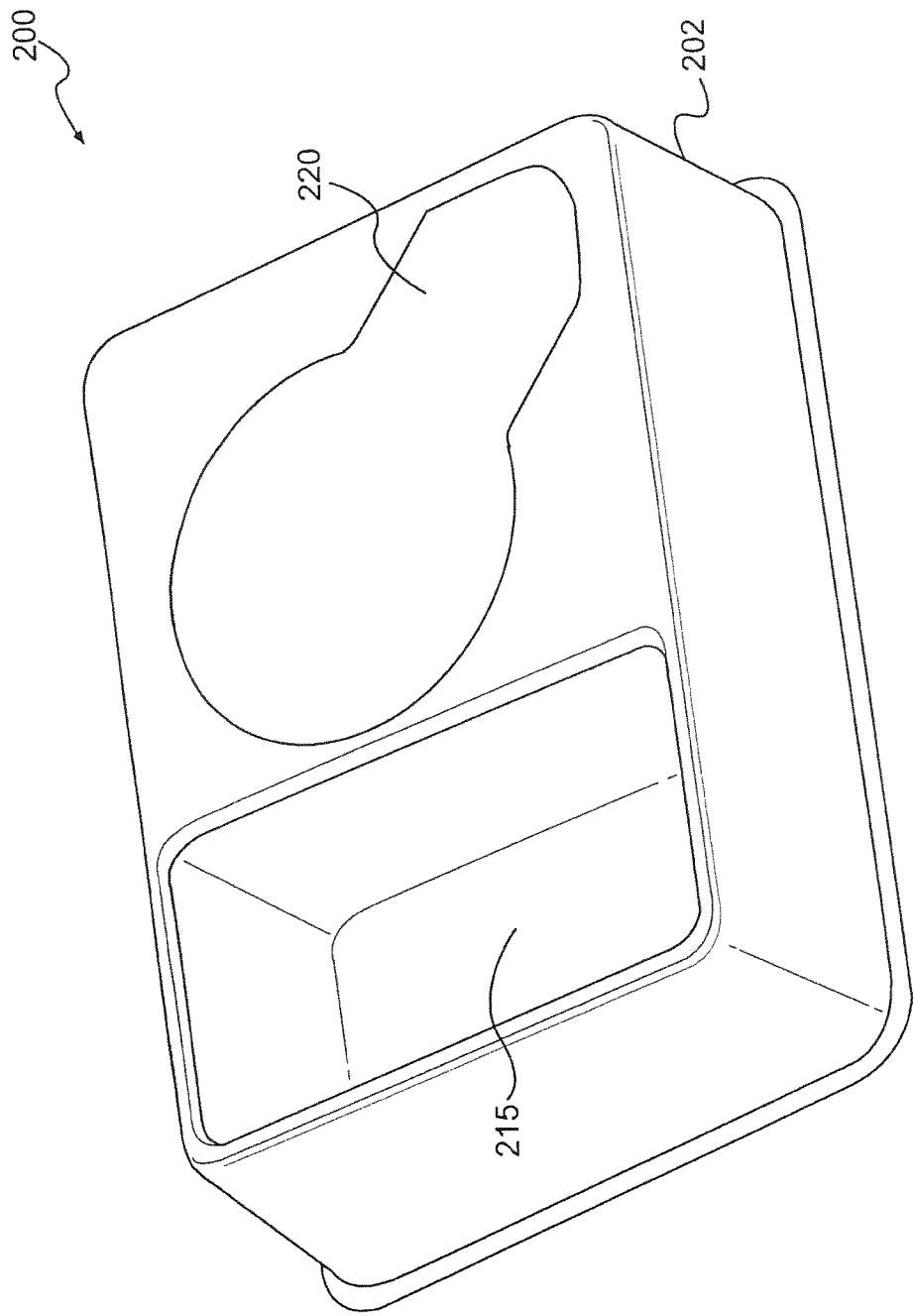
FIG. 16 is a perspective view of another embodiment of an instant self-heating depilatory container.

FIG. 16 is a perspective view of another exemplary disposable depilatory material dispenser embodiment 200. The exemplary dispenser 200 is provided with tray 215 for placement of gauzes, strips, antiseptic wipes, and so forth. Also, container 202 is more box-like, rather than circular as seen in FIG. 9's exemplary dispenser 100. Of course, the shape of container 202 may be varied according to design preference. The sealing membrane 220 is elongated at one end for reasons made evident below.

Figure 17:
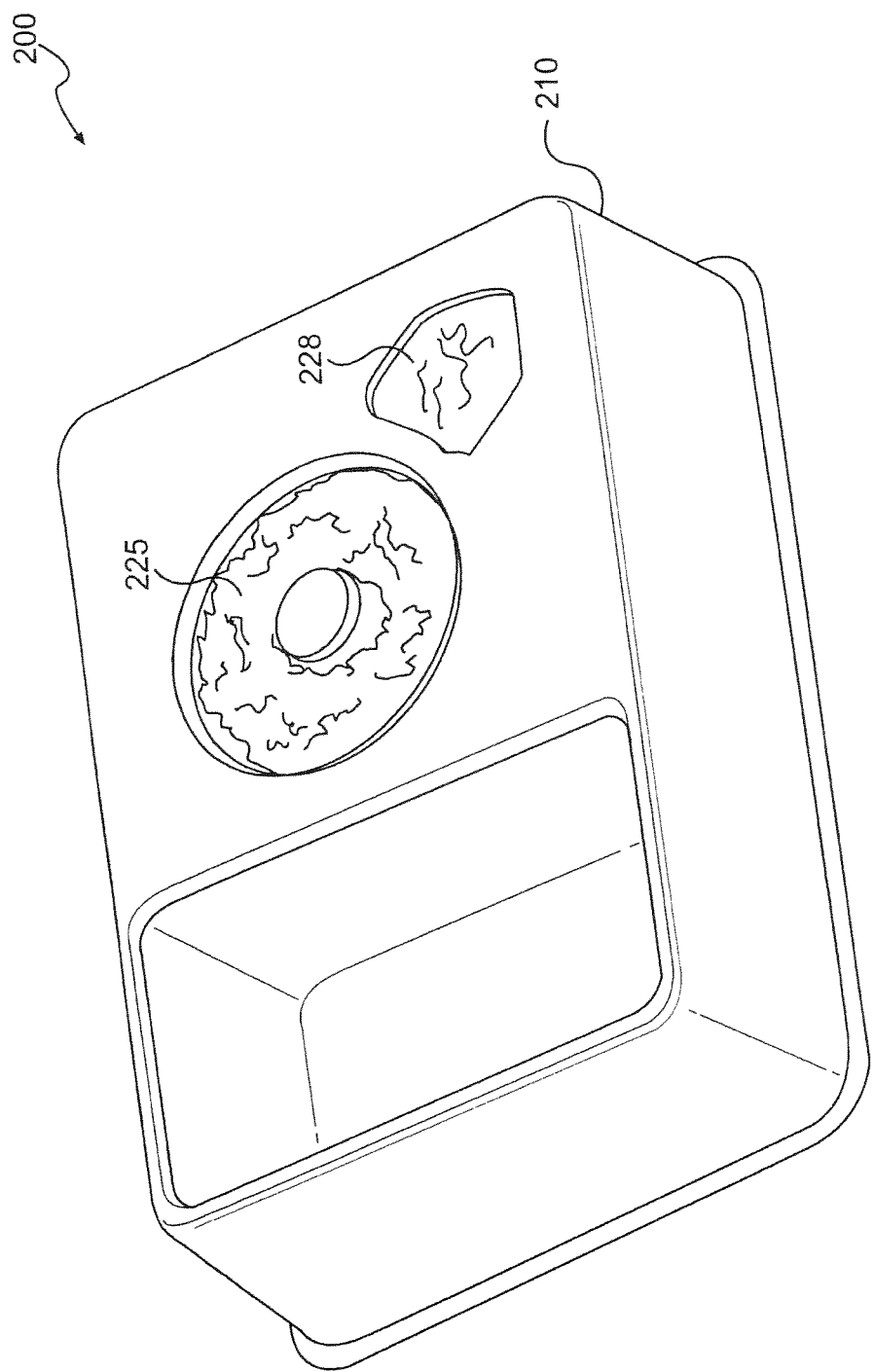
FIG. 17 is a perspective view of the instant self-heating depilatory container of FIG. 16 with the sealing membrane removed.

FIG. 17 is a top side view of the exemplary dispenser 200 of FIG. 16, with sealing membrane 220 removed. The exemplary dispenser 200 provides a well 210 that is exterior to wax chamber 225, in contrast to the inner well 110 shown in the above Figures. Since well 210 is displaced from the center of wax chamber 225, it can be sized to accommodate a larger volume of activator as well as the fact that the wax chamber 225 can be made larger, if so desired. The function of well 210 is similar to the inner well 110 described above. The activator 228 can be situated a priori in well 210, being sealed by sealing membrane 220. Via a dart (not shown) disposed in or below well 210, the secondary compound 228 can be chan-
neled into the exothermic reactant chamber (not shown) containing the exothermic reactant (not shown).

Figure 18:
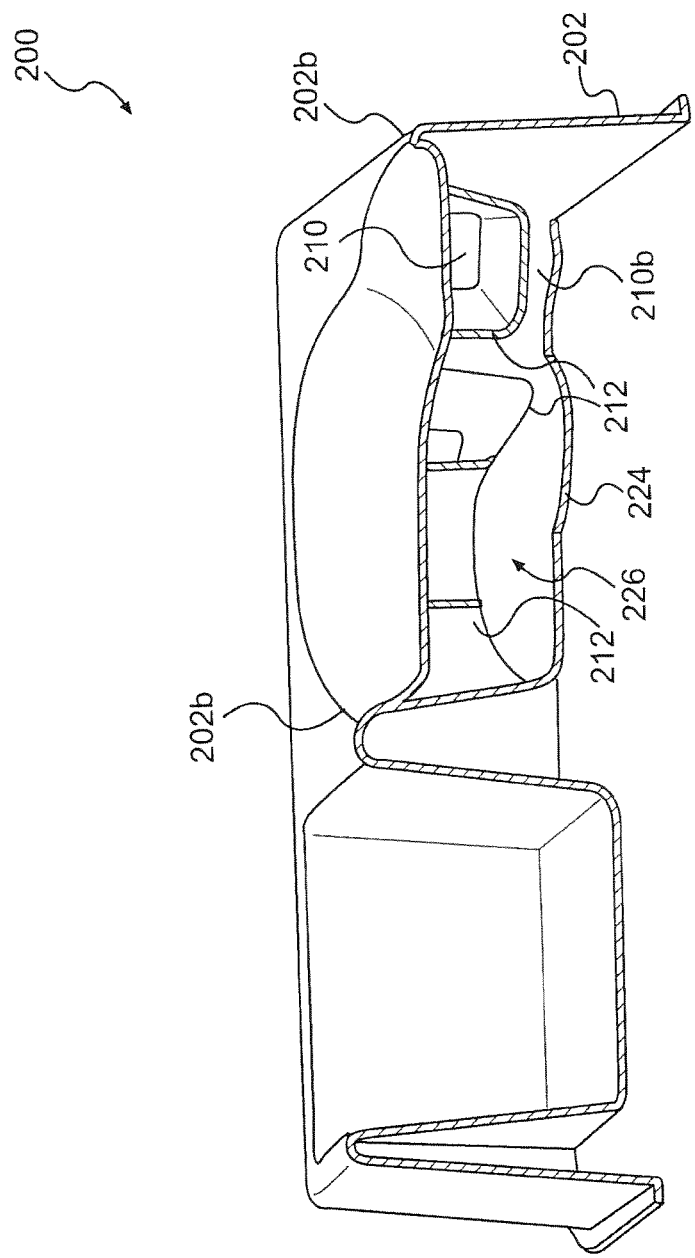
FIG. 18 is a cross-sectional side view of the instant self-heating depilatory container of FIG. 16.

FIG. 18 is a diagonal cross-sectional view of the exemplary dispenser 200 shown in FIG. 17. Container 202 has an inner wall 224 which houses the exothermic reactant (not shown) in cavity 226. The cavity 226 is formed between inner wall 224 and interior wall 212 of inner well 210 and wax chamber 225 and provides a conduit for distribution of secondary compound 228 from bottom 210b of inner well 210 to exothermic material. Overlapping portions of the interior wall 212 can be attached to various surface(s) 202b of the container 202, to "seal" the cavity 226 and prevent escape of exothermic material or gases when activated.

The user can rupture the bottom 210b of inner well 210 via any means, such as, for example, pressing downward on a dart (not shown) placed below the bottom 210b of inner well 210 or, a dart (not shown) located inside the inner well 210. In other embodiments, it may be desirable to provide an applicator that is pointed at one end (see FIG. 19), for enabling the rupturing of the bottom 210b of the inner well 210. Means for rupturing or opening the bottom 210b or any part of inner well 210 to allow secondary compound to enter cavity 226 are well known, therefore they are not further elaborated herein. Upon activation of exothermic material 211 (not shown), heating of wax in wax chamber 225 can commence, and be accelerated by shaking container 202 to more evenly distribute secondary compound 228 (not shown) within cavity 226.

Figure 19:
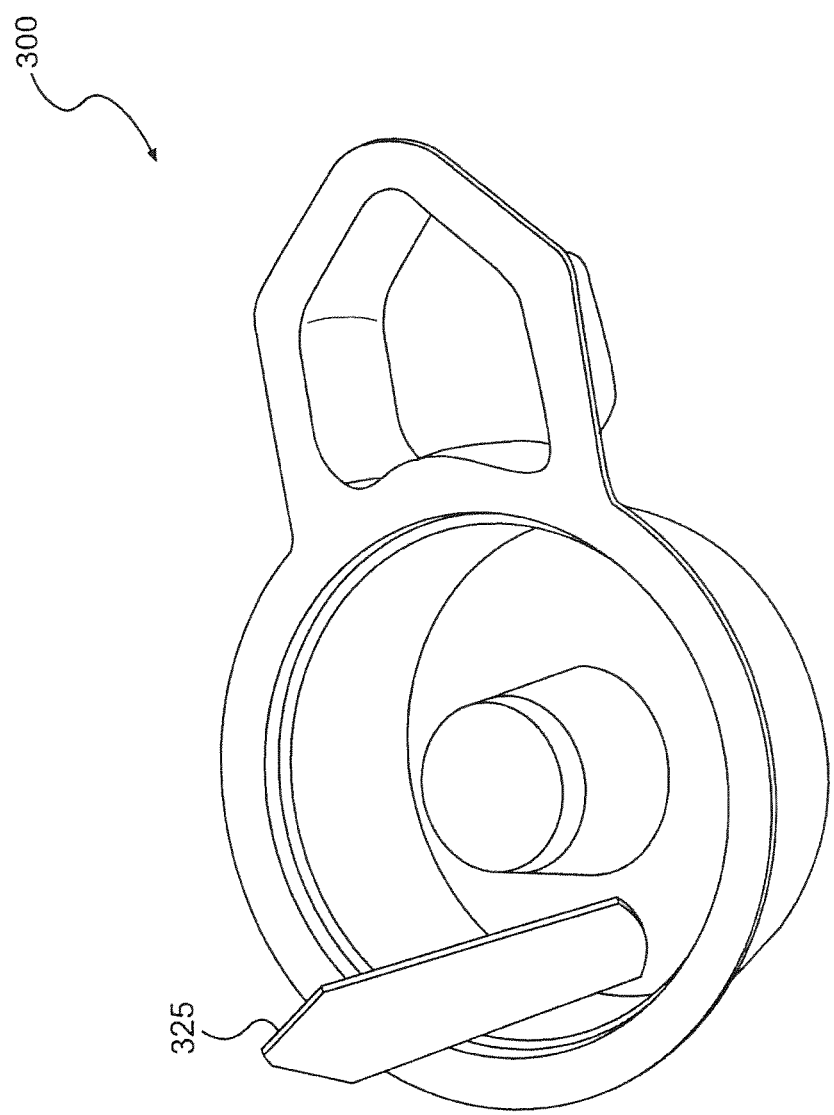
FIG. 19 a perspective view of another embodiment of an instant self-heating depilatory container.

FIG. 19 is a perspective view of a wax dispenser servlet 300 with an applicator 325. This Figure is instructive in demonstrating that different waxes can be pre-packaged into servlets 300 and then attached to containers 202, as needed. The ability to separate the wax dispenser servlet 300 from the container 202 enables different waxes to be prepared (for example, on an assembly line) and then combining the servlet 300 with a container blank to form an exemplary wax dispenser 200. Of course, the servlet 300 may be fitted to a container not having a tray 215 and may be offered independently as a stand-alone wax dispenser, if so desired. Also, the servlet 300 may be replaced while retaining the container 202 for subsequent use. For example, for a used wax dispenser 200, the used servlet 300 may be removed and discarded and the expended exothermic material 211 may be discarded from the container 202. New exothermic material 211 may be placed in the container 202 and another servlet 300 inserted therein for a next use.

As discussed with reference to FIG. 15B, the embodiment shown in FIG. 19 may also use the pointed nature of the applicator 325 to provide piercing or breaching capabilities, as needed. Of course, the pointed nature of the applicator 325 can also be used for applying wax, if so desired. As is apparent, modifications may be made to the various aspects and elements of the exemplary embodiments disclosed herein, without departing from the spirit and scope of the invention. For example, the container of FIGS. 16-18 may configured to allow acceptance of the donut-like wax dispenser of FIGS. 9-15, or other shaped wax dispensers. Additionally, different chambering or cavities 226 may be used to distribute exothermic material 211. Further, in some embodiments, the tray 215 may be designed to "fold" over or under the wax chamber 225, for compactness (in shipping) or for disposal (covering the spent wax).

Another embodiment of an instant self-heating container is shown in FIGS. 20-23. This embodiment is particularly advantageous for use as an instant self-heating dispenser, for example (but without limitation) for depilatory waxes. Starting with FIG. 20, instant self-heating dispenser 400 includes flexible outer tube 410 which has nozzle 416 at one end.

Flexible outer tube may be made from any flexible material including, without limitation, plastics such as polypropylene or polyethylene. The other end of flexible outer tube 410 is open but once assembled is sealed by cap 412. Cap 412 comprises a vent hole 418 which is sealed by membrane 414. Membrane 414 may be adhered over vent hole 418 by a water-based adhesive that is easily dissolved by steam. Optionally attached to nozzle 416 of flexible outer tube 410 is applicator 420. Applicator 420 comprises attachment module 422. A spreading device, such as roller 424, is connected to attachment module 422.

Figure 20:
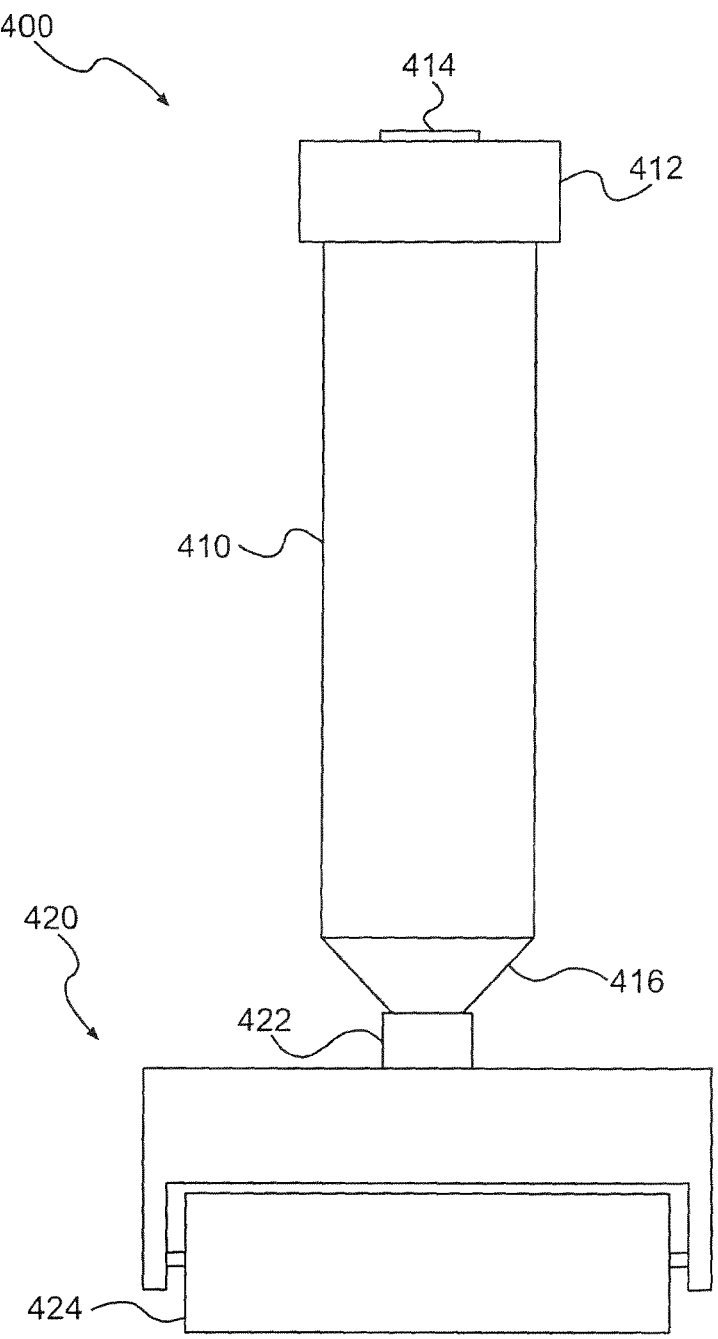
FIG. 20 is a front plan view of an embodiment of an instant self-heating dispenser.
Figure 20A:
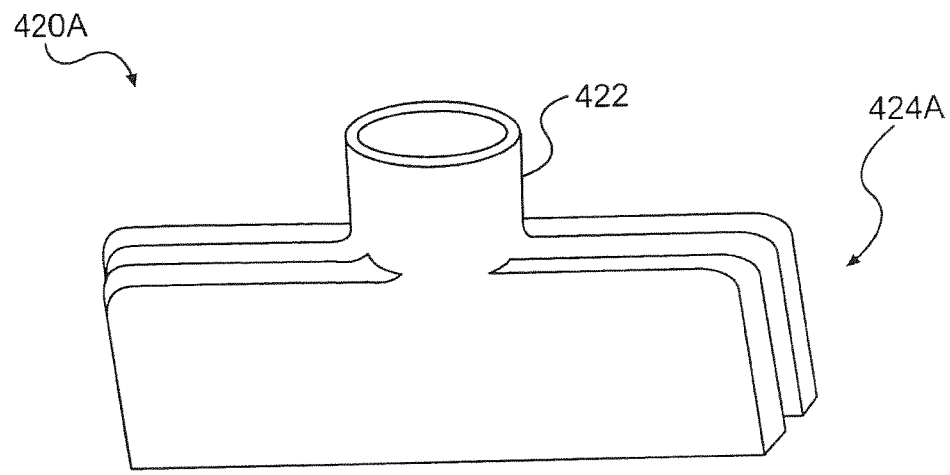
FIG. 20A is a perspective view of an alternate applicator with parallel paddles for use with the instant self-heating dispenser of FIG. 20.
Figure 20B:
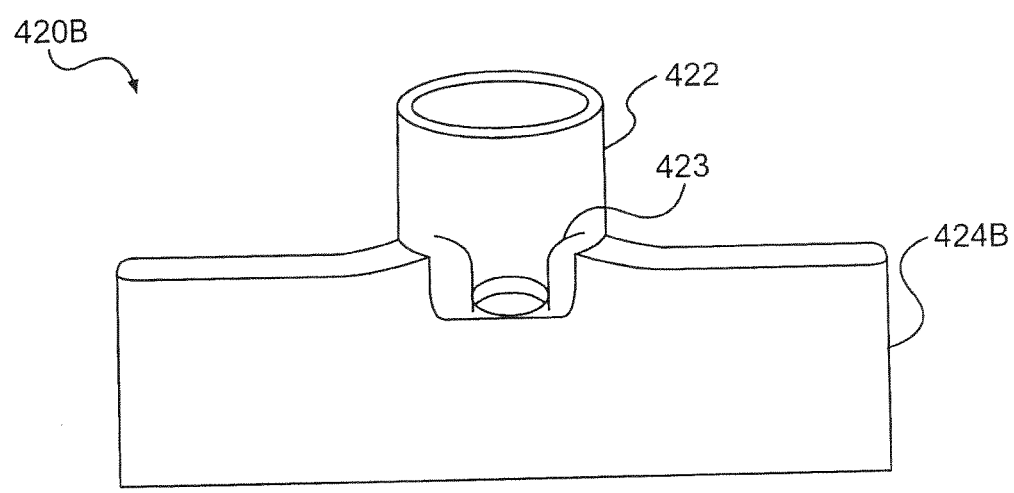
FIG. 20B is a perspective view of an alternate applicator with a squeegee for use with the instant self-heating dispenser of FIG. 20
Figure 21:
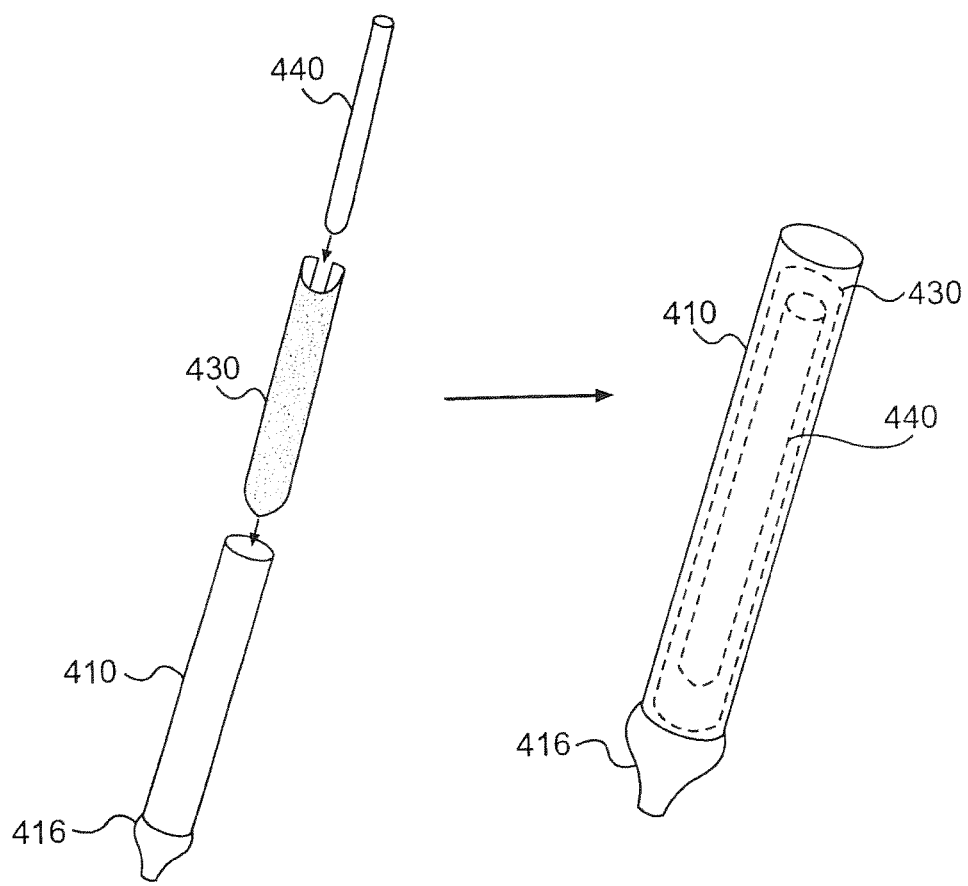
FIG. 21 is an exploded and hidden lines view of the outer tube, reaction vessel and activator vessel of the instant self-heating dispenser of FIG. 20.
Figure 22:
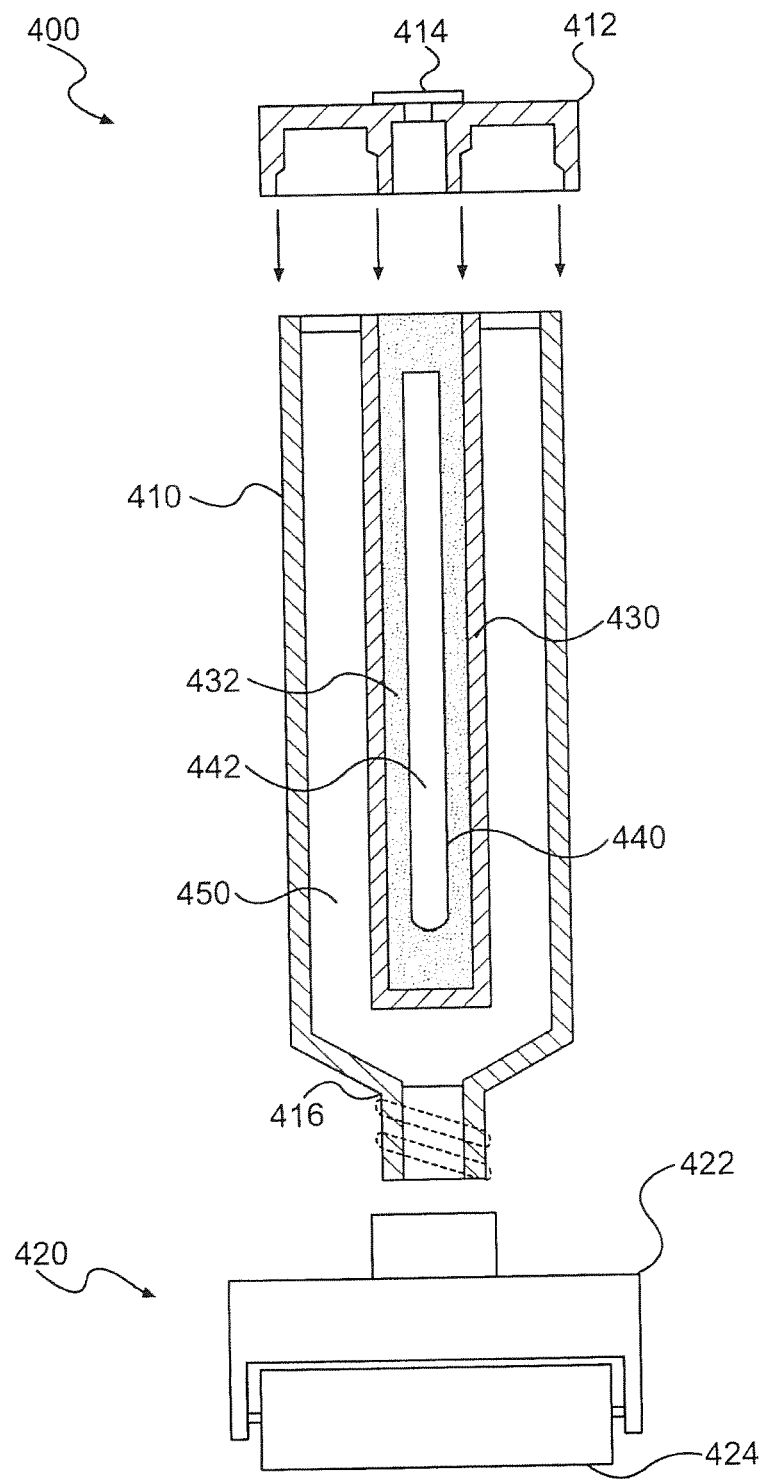
FIG. 22 is an exploded view of the instant self-heating dispenser of FIG. 20.
Figure 23:
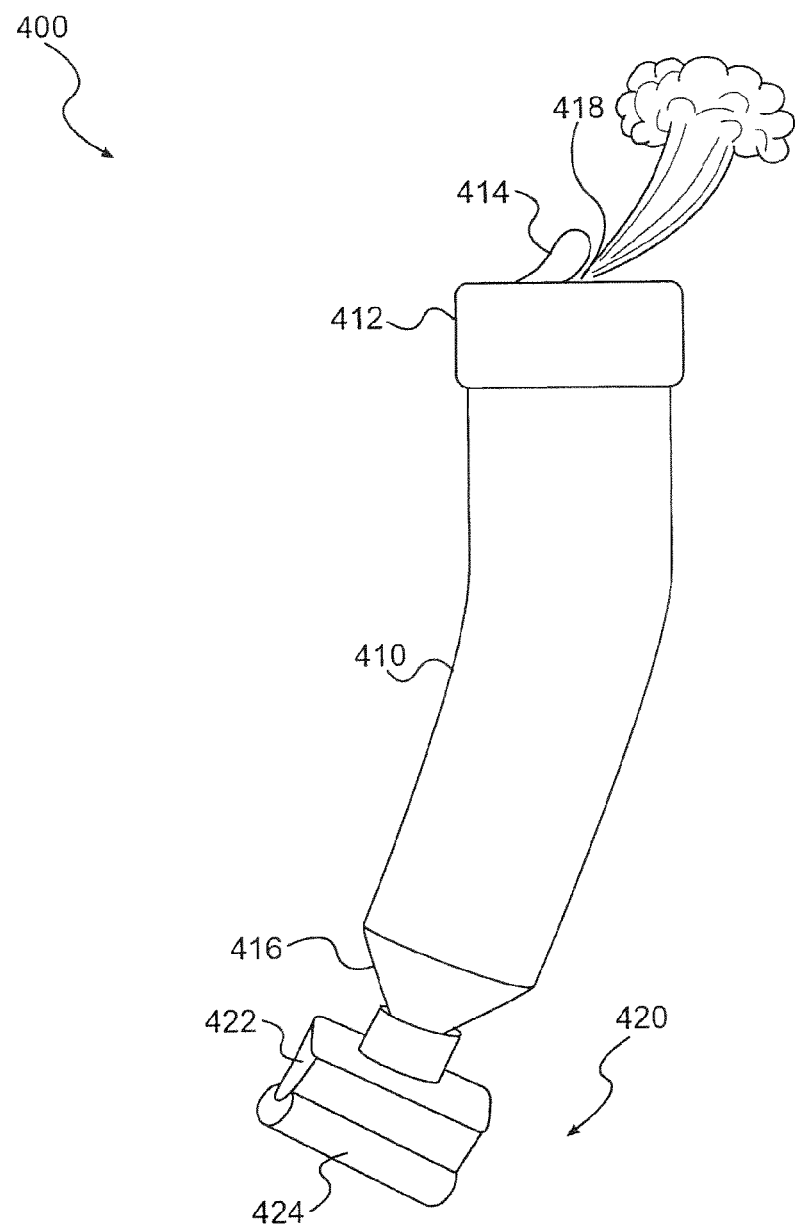
FIG. 23 is a perspective view of the instant self-heating dispenser of FIG. 20 being bent and activated.

However, other spreading devices are also contemplated. For example, as shown in FIG. 20A, applicator 420A comprises attachment module 422 and parallel blades 424A. Contents dispensed from nozzle 416 flow through attachment module 422 into the space between parallel blades 424A which force dispensed contents to spread out evenly. Similarly, as shown in FIG. 20B, applicator 420B comprises attachment module 422, spout 423 and squeegee (i.e., flexible rubber blade) 424B. Contents dispensed from nozzle 416 flow through attachment module 422 in front of squeegee 424B which forces dispensed contents to spread out evenly as squeegee 424B is slid against a surface. Other spreading devices, such as sponges, may also be used.

Continuing with FIGS. 20-23, instant self-heating dispenser 400 also includes flexible reaction vessel 430 and frangible activator vessel 440. Flexible reaction vessel 430 is disposed inside flexible outer tube 410, and frangible activator vessel 440 is disposed inside flexible reaction vessel 430. Frangible activator vessel 440 is easily ruptured by bending and may be, for example, a very thin-walled glass tube with wall thickness on the order of 1 mm. Frangible activator vessel 440 contains activator 442 which may be a liquid such as water or an electrolyte. Flexible reaction vessel 430 may be a flexible plastic tube or may simply be an impermeable pouch made from plastic or latex. Flexible reaction vessel 430 contains reactant 432 which may be free-floating inside flexible reaction vessel 430 or, more advantageously, inside an elongate water permeable pouch. In one embodiment, reactant 432 is Lava Gel® as discussed above in reference to the previously disclosed embodiments of instant self-heating containers.

Once flexible reaction vessel 430 and frangible activator vessel 440 are in place inside flexible outer tube 410, flexible outer tube 410 is filled with contents 450 which are to be heated. Once flexible outer tube 410 is filled with contents 450, cap 412 is secured to the open end of flexible outer tube 410. Cap 412 may be secured to flexible outer tube 410 by any suitable means including spin welding, thermal or ultrasonic welding, or adhesives. Attachment module 422 of applicator 420 (or 420A or 420B) is also attached to nozzle 416 by any suitable means, including by threaded connection, press-fit connection, or adhesives.

To use instant self-heating dispenser 400, the user bends outer tube 410 until frangible activator vessel 440 ruptures. When this occurs, activator 442 is immediately released into flexible reaction vessel 430 where it combines with reactant 432 thereby causing an exothermic reaction. Exhaust gases, such as steam, build pressure inside flexible reaction vessel 430 until membrane 414 is rupture or torn away, thereby releasing the exhaust gases through vent 418. Where a water-based adhesive is used to attach membrane 414 to cap 412, the steam in the exhaust gases quickly dissolves the adhesive and facilitates removal of membrane 414.

As flexible reaction vessel 430 is not frangible and therefore remains intact despite the bending of outer tube 410, the combined reactant/activator mixture does not intermix with contents 450. Rather, contents 450 are heated by conduction through the walls of flexible reaction vessel 430. As flexible reaction vessel 430 is enveloped by contents 450, contents 450 are heated from the inside out evenly in all directions. Contents 450 are thereby heated very quickly. Where contents 450 is depilatory wax, the wax quickly melts and is ready to apply to a body part such as a leg. Holding instant self-heating dispenser with applicator 420 below cap 412 allows contents 450 to flow out nozzle 416 into applicator 420 and onto roller 424. By rolling roller 424 along a body part, an even distribution of contents 450 on the body part is achieved.

The dimensions of instant self-heating dispenser 400 are not critical. In one embodiment, instant self-heating container may be approximately 20 cm in length and 3.0 cm in outer diameter. However, the concept of self-heating dispenser 400 is easily adapted to any dimensions, including dispensers which are much longer, shorter, thicker, or thinner. The dimensions of flexible outer tube 410 somewhat determine the dimensions of flexible reaction vessel 430 and frangible activator vessel 440 because these vessels must fit inside flexible outer tube 410. In one embodiment, the outer diameter of flexible reaction vessel 430 is 1.5 cm and the outer diameter of frangible activator vessel 440 is 1.0 cm. Of course, a wide variety of dimensions of flexible outer tube 410, flexible reaction vessel 430, and frangible activator vessel 440 may be used without departing from the scope and spirit of the present disclosure. Finally, in one embodiment, flexible outer tube 410 may contain 15 g of depilatory wax. Of course, the amount of contents inside flexible outer tube 410 is determined by the relative dimensions of flexible outer tube 410 and flexible reaction vessel 430, and thus any amount of contents may be provided inside flexible outer tube 410 depending on the dimensions of instant self-heating dispenser 400.

It will be understood that many additional changes in the details, materials, steps and arrangement of parts, which have been herein described and illustrated to explain the nature of the invention, may be made by those skilled in the art within the principle and scope of the invention as expressed in the appended claims.

What is claimed is:

1. A self-heating container, comprising:
a first shell configured to receive contents;
a second shell external to and nested with the first shell, the second shell comprising a reaction chamber comprising a reactant therein; and
an activator container comprising an activator, wherein the activator container and the first shell each have walls that prevent the activator from penetrating the first shell; and
wherein the activator container is configured to be opened to release the activator into the reaction chamber; and
wherein, when the activator container is opened, the activator contacts the reactant and forms an exothermic reaction that radiates heat between the first shell and the second shell to transfer heat to all walls of the first shell.

2. The self-heating container according to claim 1, further comprising a contents cover sealing the contents to be received in the first shell, the contents cover having at least a portion that is openable to provide access to the first shell.

3. The self-heating container according to claim 2, further comprising an activator cover sealing the activator inside the activator container.

4. The self-heating container according to claim 3, wherein the contents cover and the activator cover are integral parts of a single container cover.

5. The self-heating container according to claim 4, further comprising a target container disposed inside in the first shell, wherein the target container comprises the contents to be received in the first shell, wherein the first shell further comprises a flat flange circumscribing the target container and the activator container, and wherein the single container cover is a peel-back cover adhered to the flat flange of the first shell.

6. The self-heating container according to claim 1, further comprising a target container disposed inside in the first shell, wherein the target container comprises the contents to be received in the first shell.

7. The self-heating container according to claim 6, wherein the first shell further comprises a spout configured to facilitate drinking the contents from the target container.

8. The self-heating container according to claim 6, wherein the target container has a bottom surface comprising at least one protrusion that forms a concentric ring.

9. The self-heating container according to claim 6, wherein the target container has a bottom with at least one protrusion extending upwardly into the target container.

10. The self-heating container according to claim 1, further comprising a piercer disposed in the activator container, wherein the piercer is configured to open the activator container and is a cross shaped member having a pointed lower end and an upper end adjacent to an upper end of the activator container.

11. The self-heating container according to claim 10, wherein the piercer is a rigid plastic spear.

12. The self-heating container according to claim 1, further comprising an aromatherapeutic substance disposed in the reaction chamber or activator container, wherein when the activator contacts the reactant, aromatherapeutic gases are released from the self-heating container.

13. The self-heating container according to claim 1, wherein the exothermic gel sequesters the activator and restricts the activator from leaking out of the reaction chamber.

14. The self-heating container according to claim 1, wherein the first shell and the second shell are bonded together.

15. The self heating container according to claim 1, wherein the activator container further comprises a lower surface, and wherein the second shell is constructed from a material stronger than the lower surface of the activator container.

16. The self-heating container according to claim 1, further comprising a pull string operatively connected to the activator container, wherein the pull string is configured to be pulled from outside the self-heating container, and wherein pulling the pull string causes the activator container to be opened to release the activator into the reaction chamber.

* * * * *